United States Patent
Rekaya et al.

(10) Patent No.: US 11,637,631 B2
(45) Date of Patent: Apr. 25, 2023

(54) OPTICAL TRANSMISSION SYSTEM AND METHOD FOR CORE SCRAMBLING FOR MULTICORE OPTICAL FIBERS

(71) Applicant: INSTITUT MINES-TELECOM, Palaiseau (FR)

(72) Inventors: Ghaya Rekaya, Antony (FR); Akram Abouseif, Paris (FR); Yves Jaouen, Paris (FR)

(73) Assignee: INSTITUT MINES-TELECOM, Palaiseau (FR)

( * ) Notice: Subject to any disclaimer, the term of this patent is extended or adjusted under 35 U.S.C. 154(b) by 0 days.

(21) Appl. No.: 17/050,351

(22) PCT Filed: Apr. 10, 2019

(86) PCT No.: PCT/EP2019/059065
§ 371 (c)(1),
(2) Date: Oct. 23, 2020

(87) PCT Pub. No.: WO2019/206631
PCT Pub. Date: Oct. 31, 2019

(65) Prior Publication Data
US 2021/0376929 A1    Dec. 2, 2021

(30) Foreign Application Priority Data

Apr. 27, 2018   (EP) .................. 18305533

(51) Int. Cl.
*H04J 14/02*     (2006.01)
*H04B 10/2581*   (2013.01)
(Continued)

(52) U.S. Cl.
CPC ..... *H04B 10/2581* (2013.01); *H04B 10/2507* (2013.01); *H04B 10/503* (2013.01);
(Continued)

(58) Field of Classification Search
CPC ............ H04B 10/2581; H04B 10/2507; H04B 10/503; H04B 10/516; H04B 10/60;
(Continued)

(56) References Cited

U.S. PATENT DOCUMENTS 7,289,707 B1 * 10/2007 Chavez-Pirson ... H01S 3/06754
385/116
11,239,917 B2 * 2/2022 Rekaya ................. H04B 10/50
(Continued)

FOREIGN PATENT DOCUMENTS

| EP | 2 903 185 A1 | 8/2015 |
| EP | 3 273 623 A1 | 1/2018 |
| WO | 2013/033703 A1 | 3/2013 |

OTHER PUBLICATIONS

Abouseif, et al., "Core Mode Scramblers for ML-detection based Multi-Core Fibers Transmission", Asia Communications and Photonics Conference, OSA Technical Digest, 2017.

*Primary Examiner* — Hibret A Woldekidan
(74) *Attorney, Agent, or Firm* — BakerHostetler

(57) ABSTRACT

The various embodiments provide an optical transmission system comprising an optical transmitter configured to transmit data over an optical fiber transmission channel made of a multi-core fiber, optical signals carrying the data propagate along the multi-core fiber according to two or more cores, each core being associated with one or more core parameters, wherein the optical transmission system comprises: a scrambling configuration device configured to determine a scrambling function depending on one or more of the core parameters associated with the two or more cores, and at least one scrambling device arranged in the optical fiber transmission channel for scrambling the two or more cores, each of the at least one scrambling device being configured to determine permuted cores by applying the scrambling
(Continued)

function to the two or more cores and to redistribute the optical signals according to the permuted cores.

13 Claims, 10 Drawing Sheets

(51) Int. Cl.
*H04B 10/2507* (2013.01)
*H04B 10/50* (2013.01)
*H04B 10/516* (2013.01)
*H04B 10/60* (2013.01)

(52) U.S. Cl.
CPC ........... *H04B 10/516* (2013.01); *H04B 10/60* (2013.01); *H04J 14/02* (2013.01); *H04J 2203/0089* (2013.01)

(58) Field of Classification Search
CPC .... H04B 10/0779; H04B 10/40; H04B 10/50; H04B 10/2525; H04B 10/07953; H04J 14/02; H04J 2203/0089; H04J 14/04; G02B 6/14; G02B 6/02042
USPC .................. 398/44, 140, 141, 142, 143, 144
See application file for complete search history.

(56) References Cited

U.S. PATENT DOCUMENTS

2014/0140694 A1    5/2014  Zhou et al.
2017/0207850 A1*   7/2017  Takahashi .............. H04B 10/60
2018/0019817 A1*   1/2018  Rekaya Ben-Othman ..................
                                                    H04B 10/60

* cited by examiner

OPTICAL TRANSMISSION SYSTEM AND METHOD FOR CORE SCRAMBLING FOR MULTICORE OPTICAL FIBERS

CROSS-REFERENCE TO RELATED APPLICATIONS

This application is a National Stage of International patent application PCT/EP2019/059065, filed on Apr. 10, 2019, which claims priority to foreign European patent application No. EP 18305533.4, filed on Apr. 27, 2018, the disclosures of which are incorporated by reference in their entirety.

TECHNICAL FIELD

The invention generally relates to optical communications and in particular to devices and methods for core scrambling in multi-core fibers.

BACKGROUND

The demand for more network capacity has significantly increased over the last twenty years as a result of the development of Internet and of the growing traffic generated by the increasing number of internet users. Optical fiber transmissions appear as key technologies to meet such continuous demand for higher transmission data rates in global telecommunication infrastructures.

Optical fibers represent optical waveguides that guide electromagnetic waves in the optical spectrum. The propagation of the waves along an optical fiber depends on several parameters related to the fiber such as its geometry, its mode structure, the distribution of the refractive index, and the material it is made of. Optical fibers typically include a transparent core surrounded by a transparent cladding material with a lower index of refraction. Light propagates in the fiber, following a succession of internal reflections. Light carries data and allows transmission over long distances at higher bandwidths than in wire-based or wireless communication systems.

In the last twenty years, wavelength division multiplexing (WDM), coherent detection and polarization division multiplexing (PDM) along with advanced signal processing techniques marked important milestones in the evolution of optical fiber transmission systems, enhancing both their capacity and their maximum reach. Nevertheless, WDM-PDM systems using conventional single mode fibers, with a small core radius where waves propagate along a single propagation mode, almost reached the non-linear capacity limit of optical transmission systems and cannot cope with the exponential growth in the demand for higher network bandwidth.

Promising solutions for overcoming the non-linear capacity limit of single mode fibers through Space division multiplexing (SDM) exploit the space in the fiber as the last degree of freedom available to increase the capacity on the optical fiber transmission. Space is accordingly used as a multiplexing dimension for the creation of a set of independent spatial channels over which independent data streams can be multiplexed and carried in the same fiber. Using SDM, the capacity can be multiplied by the number of independent spatial channels. SDM techniques enable increasing both the reach and the transmission capacities of optical fiber transmission links while reducing the cost of the transmission system.

Space division multiplexing can be implemented using multi-mode fibers (MMFs) or multi-core fibers (MCFs).

Multi-mode fibers allow the propagation of light according to different spatial propagation modes. The core of a multi-mode fiber is enlarged to allow the propagation of more than one spatial mode. The number of reflections created as the light passes through the core increases, creating the ability to propagate more data at a given time slot.

Multi-mode fibers can offer higher transmission rates than single-mode fibers. However, multi-mode fibers are affected by several impairments mainly due to imperfections of the optical components (e.g. fibers, amplifiers, spatial mode multiplexers), the crosstalk effects between the spatial modes, and non-unitary crosstalk effects known as mode dependent loss (MDL).

Multi-core fibers incorporate multiple identical or different cores in a single fiber, each core being single-mode or multi-mode. Multi-core fibers can be classified into uncoupled and coupled MCFs.

In uncoupled MCFs, each core has to be suitably arranged to keep the inter-core crosstalk sufficiently small for long distance transmission applications to detect signals from each core separately (i.e. no multiple-input multiple-output equalization is required at receiver). Several types of uncoupled multi-core fibers have been designed according to different core arrangements. These designs comprise 'homogeneous MCFs' and 'homogeneous with trench-assisted MCFs' incorporating multiple identical cores, and heterogeneous MCFs' incorporating multiple cores of several types.

In coupled MCFs, several cores are placed so that they strongly and/or weakly couple with each other. Coupled MCFs supporting a single spatial mode and multiple spatial modes can be used in high-power fiber laser applications.

Multi-core fibers are affected by several impairments due to the misalignment losses and crosstalk effects. The crosstalk and misalignment losses induce a core dependent loss (CDL). The CDL is an impairment effect similar to the MDL affecting multi-mode fibers.

The misalignment losses rise due to the imperfections of the optical fiber at the splices and connector part. Three types of misalignment losses exist comprising the longitudinal displacement losses, the transverse displacement losses, and angular displacement losses.

The crosstalk effect is due to the existence of multiple cores in one cladding which generates a crosstalk between the neighboring cores. The crosstalk increases with a smaller inter-core distance and represents the main limitation to the capacity in terms of the optical signal quality and the number of cores integrated inside a multi-core fiber. Further, low crosstalk effects enable a decoding complexity reduction at the optical receiver since no multiple-input multiple-output equalization is required for small crosstalk values Optical solutions can be applied during the manufacturing of the optical fibers in order to reduce the crosstalk effect.

A first approach consists in increasing the inter-core distance. This approach enables reducing the crosstalk effect, however it limits the number of cores inside the fiber due to the cladding diameter and consequently it decreases the core density and capacity.

A second approach is based on trench assistance with the use of trench-assisted homogeneous multi-core fibers. Trench assistance reduces the coupling coefficients by surrounding each core with a low-index trench layer. The crosstalk in trench-assisted fiber designs is independent of the inter-core distance.

A third solution uses heterogeneous MCFs in which an intrinsic index difference between neighbor cores is introduced, enabling reducing the crosstalk effect.

Further, a random core scrambling technique, disclosed in "A. Abouseif, G. R. Ben-Othman, and Y. Jaouen, Core Mode Scramblers for ML-detection based Multi-Core Fibers Transmission, in Asia Communications and Photonics Conference, OSA Technical Digest, 2017", has been recently proposed to mitigate the CDL in heterogeneous trench-assisted MCFs and to enhance the system performance. It is demonstrated that random core scrambling enables achieving better performance in terms of error probabilities; however random scrambling requires installing a large number of random scramblers which induces an additional implementation complexity and cost on the transmission system.

Although existing solutions enable a reduction of the crosstalk in multi-core fibers, they do not enable a complete suppression of the crosstalk and do not provide a complete mitigation of the CDL. There is accordingly a need for designing efficient techniques enabling a complete mitigation of CDL effects in multi-core fibers-based SDM systems.

SUMMARY

In order to address these and other problems, there is provided an optical transmission system comprising an optical transmitter configured to transmit data over an optical fiber transmission channel made of a multi-core fiber. Optical signals carrying the transmit data propagate along the multi-core fiber according to two or more cores, each core being associated with one or more core parameters. The optical transmission system comprises:

a scrambling configuration device configured to determine a scrambling function depending on one or more of the core parameters associated with the two or more cores of the multi-core fiber, and at least one scrambling device arranged in the optical fiber transmission channel for scrambling the two or more cores, the at least one scrambling device being configured to determine permuted cores by applying the scrambling function to the two or more cores and to redistribute the optical signals according to the permuted cores.

In some embodiments, a core parameter associated with each core is chosen in a group comprising a core type and a core loss value.

According to some embodiments, the scrambling configuration device may be configured to determine the core loss value associated with each core depending on crosstalk coefficients and misalignment losses, a crosstalk coefficient representing the crosstalk between said each core and a neighbor core to said each core, the misalignment losses representing misalignments of the multi-core fiber.

According to some embodiments, the scrambling configuration device may be configured to order the two or more cores according to a given order of the core loss values associated with said two or more cores, the scrambling configuration device being configured to determine the scrambling function depending on the order of the core loss values associated with said two or more cores.

According to some embodiments, the scrambling configuration device may be configured to determine the scrambling function for permuting a core associated with a high core loss value with a core associated with a small core loss value.

According to some embodiments, in which the number of the two or more cores in the multi-core fiber is an even number, the scrambling configuration device may be configured to determine the scrambling function for permuting the two or more cores two-by-two according to the permutation of the core associated with the $i^{th}$ highest core loss value with the core associated with the $i^{th}$ lowest core loss value, with i being comprised between 1 and the half of the number of cores in said multi-core fiber.

According to other embodiments in which the number of the two or more cores in the multi-core fiber is an odd number, the scrambling configuration device may be configured to determine the scrambling function for permuting the two or more cores two-by-two according to the permutation of the core associated with the $i^{th}$ highest core loss value with the core associated with the $i^{th}$ lowest core loss value, with i being comprised between 1 and the floor part of half the number of cores in the multi-core fiber.

According to some embodiments in which the multi-core fiber is an homogeneous multi-core fiber, the two or more cores are associated with an identical core type.

According to other embodiments in which the multi-core fiber is an heterogeneous multi-core fiber, at least two of the two or more cores are associated with different core types.

According to some embodiments in which the multi-core fiber is an heterogeneous multi-core fiber, the scrambling configuration device may be configured to determine the scrambling function depending on the core types associated with the two or more cores, the scrambling function corresponding to a two-by-two permutation of the two or more cores according to the permutation of at least a first core with a second core, the first core and the second core being associated with different core types.

According to some embodiments in which the multi-core fiber is an heterogeneous multi-core fiber, the scrambling configuration device may be configured to determine the scrambling function depending on the core types and the core loss values associated with the two or more cores, the scrambling function corresponding to a two-by-two permutation of the two or more cores according to the permutation of at least a first core with a second core, the first core and the second core being associated with different core types and different core loss values.

According to some embodiments, the at least one scrambling device may be configured to apply the scrambling function in the electrical field or in the optical field, a scrambling device configured to apply the scrambling function in the optical field being chosen in a group comprising optical converters, optical multiplexers, optical multiplexing devices, and photonic lanterns.

According to some embodiments, at least one of the two or more cores is a multi-mode core comprising two or more spatial propagation modes.

In some embodiments, the optical transmitter may comprise:

an error correcting code encoder configured to encode said data into a codeword vector by applying at least one error correcting code;

a modulator configured to determine a set of modulated symbols by applying a modulation scheme to said codeword vectors, and a Space-Time encoder configured to determine a codeword matrix by applying a Space-Time code to said set of modulated symbols.

There is also provided a method for transmitting data in an optical transmission system over an optical fiber transmission channel made of a multi-core fiber, optical signals carrying said data propagate along the multi-core fiber according to two or more cores, each core being associated with one or more core parameters. The method comprises scrambling the two or more cores, said scrambling comprises:

determining a scrambling function depending on one or more of the core parameters associated with the two or more cores;

determining a permutation of the two or more cores by applying the scrambling function, and redistributing the optical signals according to said permutation of the two or more cores.

The scrambling techniques according to the various embodiments provide efficient mitigation of crosstalk effects and misalignments losses in multi-core fibers by averaging the losses experienced by the different cores of the multi-core fiber.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention.

DETAILED DESCRIPTION

Figure 1:
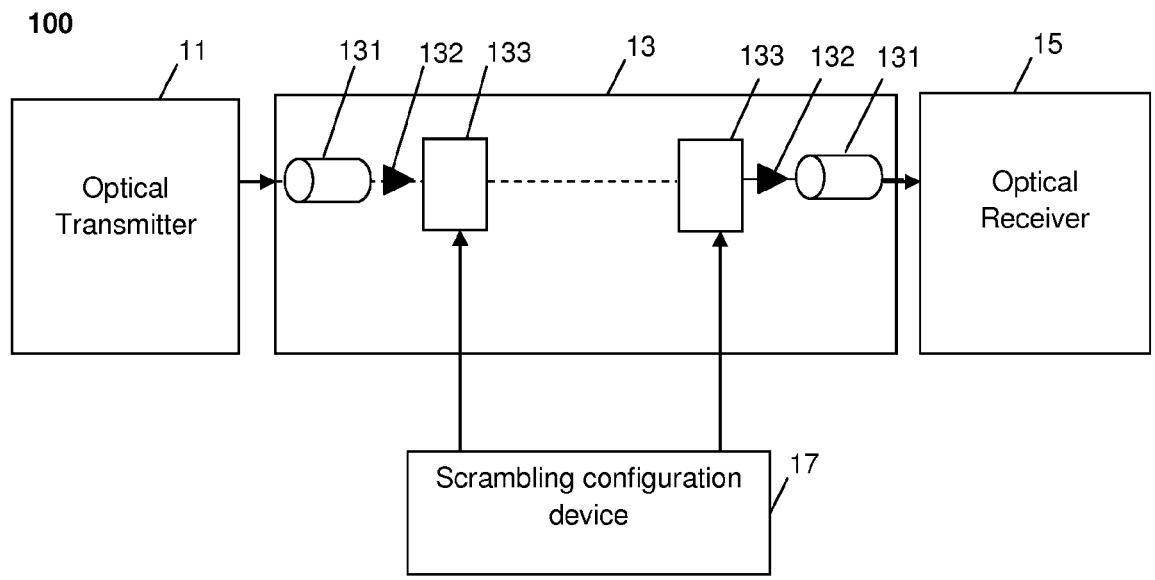
FIG. 1 illustrates a schematic diagram of an exemplary application of the invention in optical communication systems.

Embodiments of the present invention provide a multi-core optical fiber transmission system implementing efficient deterministic scrambling devices and methods enabling a reduction of the crosstalk and misalignment losses impacting the multi-core fiber.

Devices and methods according to the various embodiments of the invention may be implemented in optical fiber transmission systems applied to a wide variety of applications. Exemplary applications comprise, without limitation, optical fiber communications, aerospace and avionics, data storage, automotive industry, imaging, transportation, sensing, and photonics.

Exemplary communication applications comprise desktop computers, terminals, and nationwide networks. Optical fibers may be used to transmit light and thus information/data over short distances (less than one meter) or long distances (up to hundreds or thousands of kilometers for example in communications over metropolitan networks, wide area networks, transoceanic links). Such applications may involve transfer of voice (e.g. in telephony), data (e.g. data supply to homes and offices known as fiber to the home), images or video (e.g. transfer of internet traffic), or connection of networks (e.g. connection of switches or routers and data center connectivity in high-speed local area networks).

In an exemplary implementation of the invention in the field of aerospace and avionics industries, optical fiber-based products may be used in military and/or commercial applications. Optical fiber technologies and products are designed in such applications to meet rigorous testing and certifications requirements in harsh environments and conditions.

In an exemplary implementation of the invention in data storage applications, optical fibers may be used in data storage equipments as a link between multiple devices in a network and/or as part of a storage system. Optical fiber connectivity offers very high bandwidth even over extended distances.

In another exemplary application of the invention to automotive industry, optical fiber technologies may be used for example in lighting/illumination, communications, and sensing for safety and control devices and systems.

In still another exemplary application of the invention to imaging applications (e.g. telemedicine), the optical transmission properties of the optical fibers may be used to transmit an image of a target or a subject area to the image view end for analysis and/or interpretation.

The invention may be used also in transportation systems, in which smart highways with intelligent traffic lights, automated tollbooths and changeable message signs may use telemetry systems based on optical fibers.

The invention may further be used in sensing applications, where optical fiber sensors are used for sensing some quantities such as temperatures, displacements, vibrations, pressure, acceleration, rotations, and concentration of chemical species. Exemplary applications of optical fiber sensors comprise sensing in high voltage and high-power machinery or in microwaves, distributed temperature and strain measurements in buildings for remote monitoring (e.g. monitoring of the wings of airplanes, wind turbines, bridges, pipelines), downhole sensing in oil exploration applications, etc.

In another application of the invention to photonics, optical fibers may be used for connecting components in optical fiber devices, such as interferometers and fiber lasers. In such application, optical fibers play a similar role as electrical wires do in electronic devices.

The following description of certain embodiments will be made with reference to communication applications, for illustration purposes only. However, the skilled person will readily understand that the various embodiments of the invention may be applied to other types of systems for different applications.

FIG. 1 illustrates an exemplary implementation of the invention in an optical transmission system 100 (also referred to as 'optical communication system') based on optical fiber transmissions. The optical transmission system 100 comprises at least one optical transmitter device 11 (hereinafter referred to as an "optical transmitter") configured to encode an input data sequence into an optical signal and transmit the optical signal optically to at least one optical receiver device 15 (hereinafter referred to as an "optical receiver") through an optical fiber transmission channel 13 (hereinafter referred to as an 'optical fiber link') configured to transmit the light over some distance.

The optical communication system 100 may comprise computers and/or softwares to control the system operability.

The optical fiber transmission channel 13 comprises a multi-core fiber comprising a concatenation of a plurality of fiber sections 131 (also referred to as 'fiber span' or 'fiber slice'). The fiber sections 131 may be aligned or misaligned.

The multi-core fiber is a cylindrical non-linear waveguide consisting of two or more cores, a cladding surrounding the two or more cores, and a coating. Each core has a refractive index. The optical signal sent by the optical transmitter 11 is multiplexed and is guided in each core of the multi-core fiber through total internal reflections due to the difference between the refractive indices of the cores and the refractive index of the cladding.

In some embodiments in which the multi-core fiber is an uncoupled fiber, each core of the multi-core fiber may act as a separate waveguide such that the optical signal can be considered as propagating independently trough the cores.

In some embodiments in which the multi-core fiber is a coupled fiber, some coupling may exist between the cores if the distance between two cores is so small that the optical signals propagating along the different cores overlap.

The optical fiber may be made of glass (e.g. silica, quartz glass, fluoride glass), typically for long-distance transmissions. For short distance transmissions, the optical fiber may be a plastic optical fiber.

The multi-core fiber may be characterized by geometrical parameters and optical parameters. Geometrical parameters may comprise the cladding diameter, the core-to-core distance, and the core-outer cladding distance. Optical parameters may comprise the wavelength, the crosstalk coefficients representing the crosstalk between the different cores of the multi-core fiber, and the refractive index difference between each core and the cladding.

In some embodiments, the optical fiber communication system 100 may operate in a wavelength region corresponding to a region chosen in a group comprising:
the window of wavelengths ranging in 800-900 nm, suitable for short-distance transmissions;
the window of wavelengths around 1.3 µm, used for example for long-haul transmissions;
the window of wavelengths around 1.5 µm, more used since the losses of silica fibers are lowest in this wavelength region.

Figure 2:
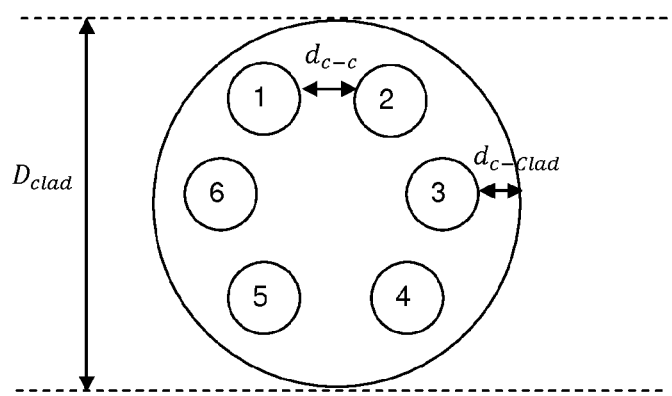
FIG. 2 illustrates a cross section of an exemplary multi-core fiber.

FIG. 2 depicts a cross section of a six-cores fiber, $D_{clad}$ representing the cladding diameter, $d_{c-c}$ designating the inter-core distance, and $d_{c-Clad}$ representing the core-outer cladding distance.

In some embodiments, the cores in the multi-core fiber may be arranged on a ring around the fiber axis for example on the edges of a hexagon. In other embodiments, the cores may be arranged on some 2-dimensional grid.

In an embodiment, the multi-core fiber may be a homogeneous multi-core fiber comprising two or more cores of identical types.

Figure 3:
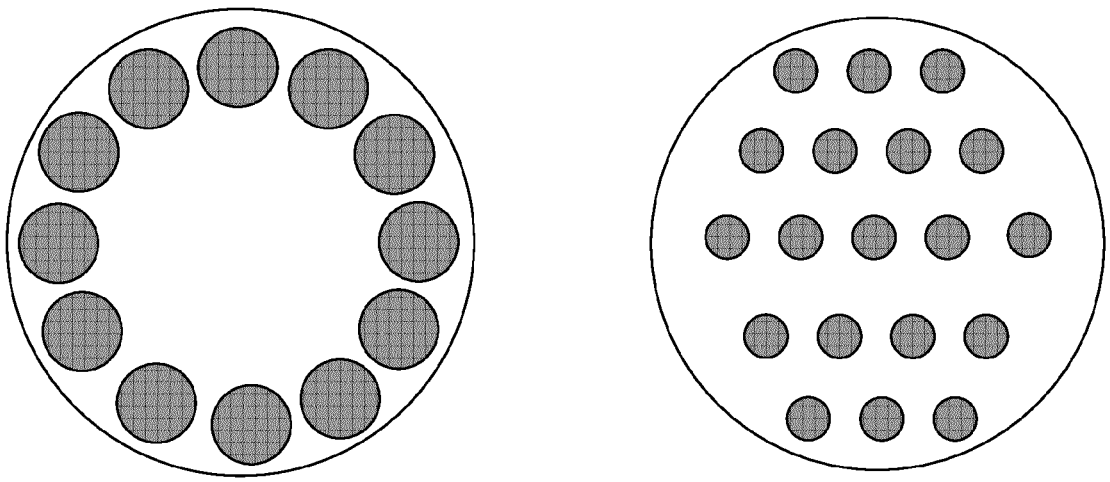
FIG. 3 depicts cross sections views of multi-core fibers, with a 12-cores homogeneous multi-core fiber comprising twelve cores arranged on a ring around the fiber axis and a 19-cores homogeneous fiber comprising nineteen cores arranged in a two-dimensional grid comprising a central core, according to some embodiments.

FIG. 3 depicts two cross sections of two exemplary homogeneous multi-core fibers, a first 12-cores fiber comprising 12 cores of identical types arranged on a ring around the fiber axis, and a second 19-cores fiber comprising 18 cores arranged on the edges of the hexagon and a central core.

In an embodiment, the multi-core fiber may be a homogeneous trench-assisted multi-core fiber, each core being surrounded by a low-index trench layer.

Figure 4:
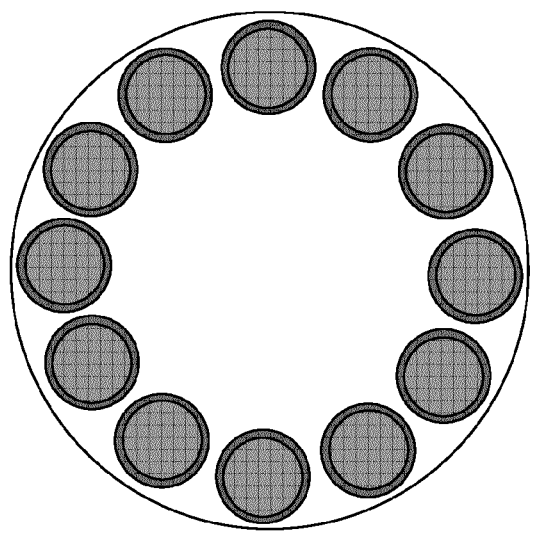
FIG. 4 depicts a cross section view of a multi-core fiber, according to some embodiments in which the multi-core fiber is a 12-cores homogeneous trench-assisted multi-core fiber.

FIG. 4 illustrates a cross section of an exemplary trench-assisted homogeneous multi-core fiber comprising 12 cores of identical types.

In another embodiment, the multi-core fiber may be a heterogeneous multi-core fiber comprising a plurality of cores among which at least two cores are of different types.

Figure 5:
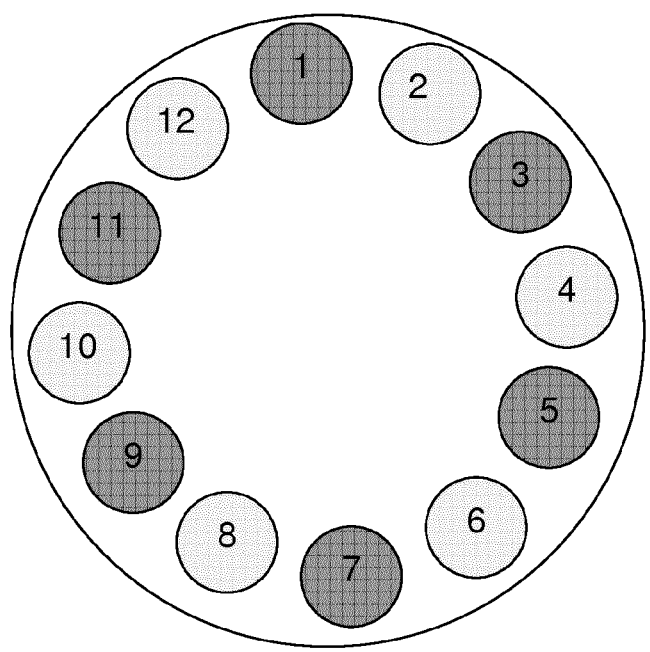
FIG. 5 illustrates a cross section view of a multi-core fiber, according to some embodiments in which the multi-core fiber is a 12-cores heterogeneous multi-core fiber comprising twelve cores arranged on a ring around the fiber axis.

FIG. 5 illustrates a cross section of an exemplary heterogeneous multi-core fiber comprising 12 cores among which cores numbered 2i+1 with i=0, . . . , 5 are identical, the cores numbered 2i+2 with i=0, . . . , 5 are identical, and the cores numbered 2i+1 are of a core type different from the core type of the cores numbered 2i+2 for i=0, . . . , 5. Each core in such heterogeneous multi-core fiber has two neighbors, each core having a core type different from the core type of its neighbor cores.

Figure 6:
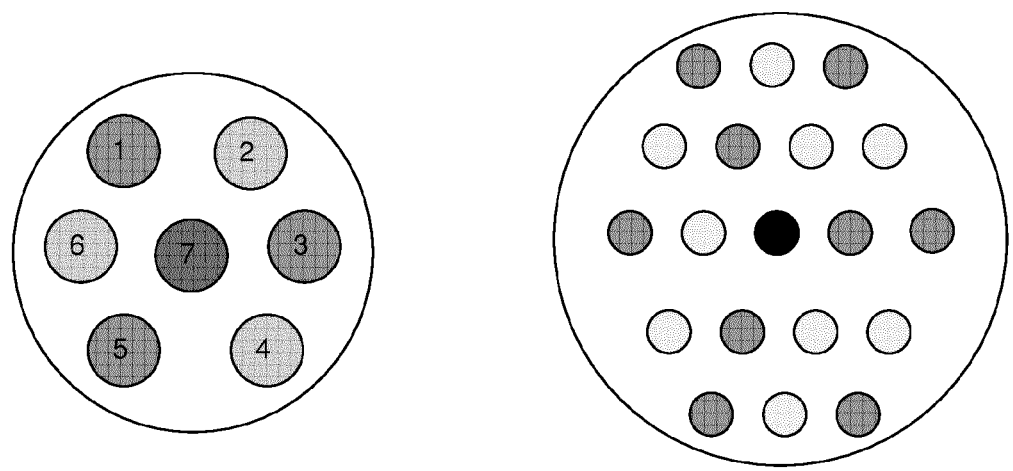
FIG. 6 illustrates cross sections views of multi-core fibers, with a 7-cores heterogeneous fiber comprising seven cores and a 19-cores heterogeneous fiber comprising three groups of cores, the cores of each the different groups having different types, according to an embodiment.

FIG. 6 illustrates two cross sections of two exemplary 7-cores fiber and 19-cores heterogeneous fibers. The 7-cores fiber comprises six cores on the edges of the hexagon numbered 1-6 and a central core numbered 7. This 7-cores fiber involves three different core types, the central core having a core type different from the types of the cores on the edges of the hexagon, and each core arranged on the edges of the hexagon having a core type different from the core type of its neighbor cores. The 19-cores fiber comprises three different core types, the central core having a core type different from the types of the cores on the edges of the hexagon.

In an embodiment, the multi-core fiber may be a trench-assisted heterogeneous multi-core fiber.

Figure 7:
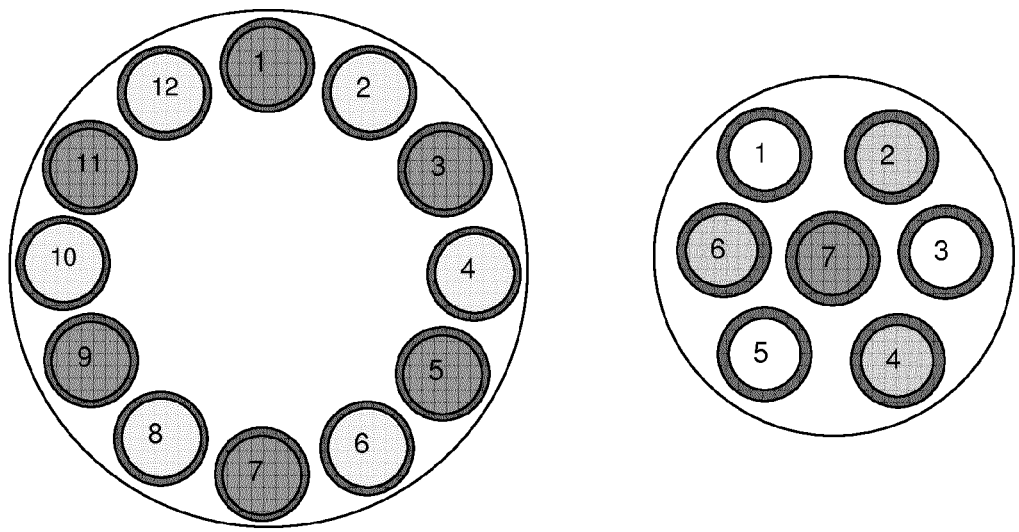
FIG. 7 illustrates cross sections view of multi-core fibers, with a 12-cores heterogeneous trench-assisted multi-core fiber comprising twelve cores arranged on a ring around the fiber axis and a 7-cores heterogeneous trench-assisted, according to some embodiments.

FIG. 7 depicts cross sections of two exemplary 12-cores and 7-cores trench-assisted heterogeneous multi-core fibers.

In some embodiments, each core of the multi-core fiber may be single mode comprising one spatial propagation mode.

In some embodiments, the multi-core fiber may comprise at least one multi-mode core comprising two or more spatial propagation modes.

In some embodiments, each core in the fiber may be associated with one or more core parameters, a core parameter being chosen in a group comprising a core type and a core loss value, the core value quantifying the loss experienced by the core in terms of the inter-core crosstalk (e.g. the crosstalk between the core and its neighbor cores) and the misalignment losses.

The optical fiber transmission channel 13 may further comprise one or more amplifiers 132 inserted in the fiber for re-amplifying the optical power and compensating for the fiber attenuation without the need to regenerate the optical signals such that a sufficient signal power can be maintained over large distance where optical signals need to be periodically amplified.

The amplifiers 132 may be inserted between each pair of fiber slices 131. In particular, an amplifier 132 inserted at the end of the optical fiber transmission channel performs signal amplification before signal detection at the receiver 15.

Each amplifier 132 may be configured to simultaneously amplify the optical signal corresponding to the plurality of cores in the multi-core fiber.

In some embodiments, the amplifiers 132 may consist of a duplication of a single core fiber amplifier.

In other embodiments, an amplifier 132 may be an optical multi-core amplifier. Exemplary optical amplifiers comprise multi-core Erbium doped fiber amplifiers (EDFAs) such as core-pumped multi-core EDFAs and cladding-pumped EDFA amplifiers. Core-pumped and cladding pumped amplifiers may use a single or a plurality of pump diodes. In particular, a pump diode per core may be used in EDFA amplifiers.

In some embodiments, the optical signal amplification may be performed in a distributed manner using the non-linear simulated Raman scattering effect. In such embodiments, the fiber is used as both a transmission link and an amplification medium.

In other embodiments, signal amplification may be achieved by a joint use of regularly arranged optical amplifiers and of simulated Raman Scattering effects.

In still other embodiments, the signal amplification may be performed in the electrical domain through an optical/electrical conversion (not illustrated in FIG. 1). In such embodiments, the optical fiber transmission channel 13 may comprise, at each amplification stage:
- a photodiode for converting the optical signal back to the electrical domain;
- an electrical amplifier for amplifying the converted electrical signal; and
- a laser diode for generating an optical signal corresponding to the amplified electrical signal.

According to some embodiments (not illustrated in FIG. 1), the optical transmission channel 13 may further comprise one or more of:
- dispersion compensators for counteracting the effects of chromatic dispersion, a dispersion compensator being configured to cancel the chromatic dispersion or compensate the dispersion for example before the detection of the optical signal at the receiver 15;
- optical switches and multiplexers such as optical add/drop multiplexers implemented in wavelength division multiplexing systems;
- one or more devices for regenerating the optical signal such as electronic and optical regenerators.

In some embodiments in which core scrambling is performed in the optical domain using optical devices, optical multiplexers may be used as core scramblers.

Figure 8:
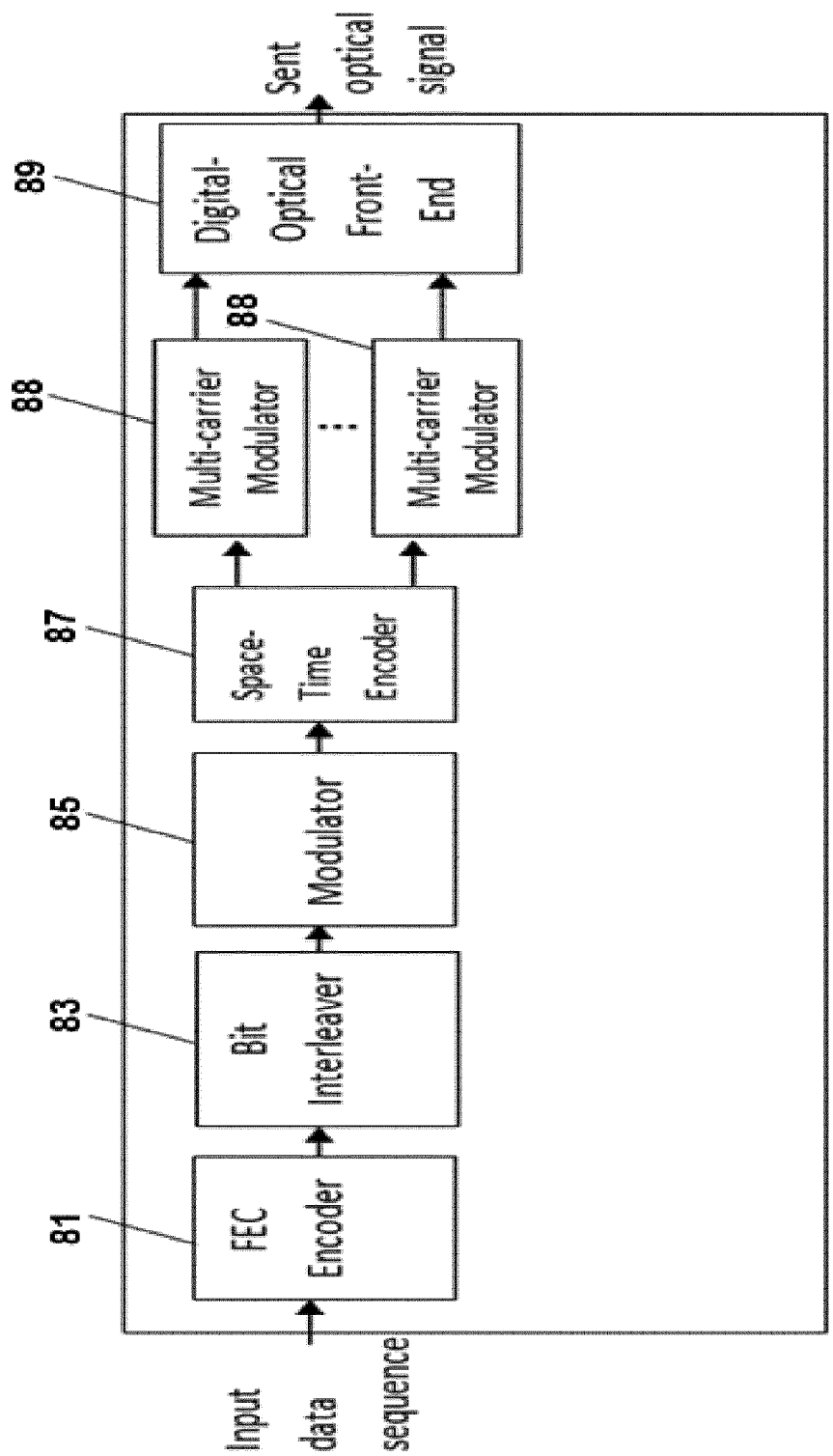
FIG. 8 is a block diagram illustrating the structure of an optical transmitter according to some embodiments of the invention.

FIG. 8 shows the components of an optical transmitter 11 according to some embodiments. The optical transmitter 11 may be configured to transform an input data sequence into an optical signal to be transmitted through the optical transmission channel 13. Accordingly, the optical transmitter 11 may comprise:
- a Forward Error Correcting code (FEC) encoder 81 (also referred to as 'an error correcting code encoder 81') configured to encode an input data sequence of length k (i.e. comprising k symbols) into an encoded sequence in the form of a codeword vector of length n>k by applying at least one Forward Error Correcting code (FEC) (also referred to as 'an error correcting code');
- an interleaver 83 configured to mix the encoded sequence to add a protection layer to the encoded symbols against burst errors before being modulated;
- a modulator 85 configured to determine a set of modulated symbols in a form of a modulated symbol vector $s_c$ by applying a modulation scheme. to the interleaved encoded sequence (or to the codeword vectors in embodiments where the transmitter 11 does not comprise an interleaver). Different modulation schemes may be implemented such as $2^q$-QAM or $2^q$-PSK with $2^q$ symbols or states. The modulated vector 5, may be a complex-value vector comprising κ complex-value symbols $s_1, s_2, \ldots, s_\kappa$ with q bits per symbol. When Modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet A=[−(q−1), (q−1)];
- a Space-Time Encoder 87 configured to determine a codeword matrix carrying the data symbols to be sent through the optical transmission channel 13 during a Time Transmission Interval (TTI) by applying a Space-Time code. The Space-Time encoder 25 may be configured to transform each received sequence (or block) of Q modulated symbols $s_1, s_2, \ldots, s_Q$ into a codeword matrix X of dimensions $N_t \times T$. A codeword matrix comprises complex values arranged in $N_t$ rows and T columns where $N_t$ designates the number of propagation cores used for propagating optical signals and T designates the temporal length of the Space-Time code and corresponds to the number of temporal channel uses. Each value of a codeword matrix accordingly corresponds to a time of use and to a propagation core used for the signal propagation. The Space-Time Encoder 87 may use a linear Space-Time Block Code (STBC) to generate the codeword matrix. The coding rate of such codes is equal to $$\frac{\kappa}{T}$$

complex symbols per channel use, where κ is the number of encoded complex-value symbols composing the vector $s_c=[s_1, s_2, \ldots, s_\kappa]^t$ of dimension κ in this case. When full-rate codes are used, the Space-Time Encoder 87 encodes $\kappa=N_tT$ complex-value symbols. Examples of STBCs are the Perfect Codes. The Perfect Codes provide full coding rates by encoding a number $\kappa=N_t^2$ ($T=N_t$) of complex information symbols and satisfy a non-vanishing determinant property.

In some embodiments, the Space-Time Encoder 87 may use a spatial multiplexing scheme known as V-BLAST scheme by multiplexing the received complex-value information symbols over the different propagation cores, without performing a coding in the time dimension.

According to some embodiments, the input data sequence may be a binary sequence comprising k bits. The FEC encoder 81 may be configured, in such embodiments, to encode the input binary sequence into a binary codeword vector comprising n bits by applying at least one binary FEC code.

In other embodiments, the input data sequence may comprise symbols that take values in a Galois Field GF(q) with q>2 representing the order of the Galois Field. In such embodiments, the FEC encoder 22 may be configured to encode the input data sequence into a codeword vector comprising n symbols, each symbol comprised in the codeword vector takes value in the Galois Field GF(q). The encoding process in this case may be performed using a non-binary FEC code constructed over GF(q) with q>2.

By performing the coding operation, the FEC encoder 81 adds redundant bits (in general redundant symbols) to the input binary sequence so that the receiver can detect and/or correct common transmission errors. The use of a FEC code provides an additional protection and immunity against transmission errors and allows significant improvement in performance with respect to uncoded transmission (i.e. transmission of modulated data without FEC encoding).

Additional improvements and reduction on the probability of error may be achieved through the concatenation of two or more FEC codes. Concatenation of codes may follow a serial, a parallel, or a multi-level architecture. The FEC encoder 81 may be accordingly configured to implement two or more FEC codes.

The optical transmitter 11 may further comprise a plurality of multi-carrier modulators 88 configured to generate multi-carrier symbols by implementing a multi-carrier modulation technique within each optical carrier involving a large number of orthogonal sub-carriers. Moreover, multi-carrier modulations may be implemented for providing a better resistance to the inter-symbol interference resulting from the fiber dispersion and crosstalk between the various cores in the multi-core fiber. Exemplary multi-carrier modulation formats comprise Orthogonal Frequency Division Multiplexing (OFDM) and Filter Bank Multi-Carrier (FBMC).

The frequency-domain signal delivered by the multicarrier modulators 88 may be then processed by a digital-optical Front-End 89 configured to convert the received frequency-domain signal to the optical domain. The digital-optical Front-End 88 may perform the conversion using a number of lasers of given wavelengths and a plurality of optical modulators (not shown in FIG. 8) associated with the used polarization states and the spatial propagation modes in the cores of the multi-core fiber. A laser may be configured to generate a laser beam of a same or different wavelength using Wavelength Division Multiplexing (WDM) techniques. The different laser beams may be then modulated using the different outputs of the OFDM symbols (or the different values of the codeword matrix in embodiments using single-carrier modulations) by means of the optical modulators and polarized according to the different polarization states of the fiber. Exemplary modulators comprise Mach-Zehnder modulators. A phase and/or amplitude modulation may be used. In addition, the modulation scheme used by the various optical modulators for modulating the different optical signals may be similar or different.

The number of the optical modulators and lasers depends on the number of used polarization states, the number of used propagation modes in each core of the multi-core fiber, and on the number of cores in the fiber.

The digital-optical front-end 88 may further comprise a FAN-IN device (not illustrated in FIG. 8) configured to inject the generated optical signals into each core of the multi-core fiber to propagate according to the available propagation modes in each core. Optical connectors may be used to connect the output end of the FAN-IN device and the input end of the multi-core optical transmission channel 13.

The optical signals generated according to any of the preceding embodiments may propagate along the fiber until reaching the other end of the optical transmission channel 13 where it is processed by an optical receiver 15.

Figure 9:
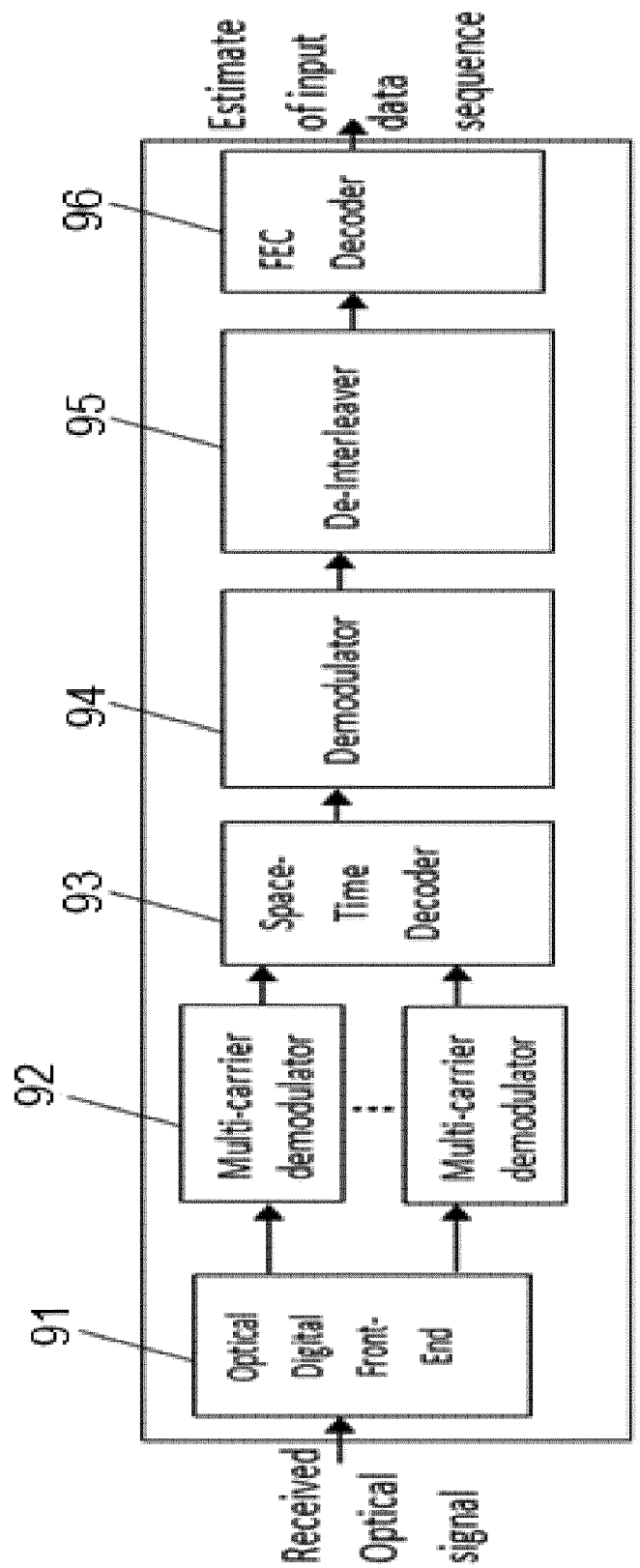
FIG. 9 is a block diagram illustrating the structure of an optical receiver according to some embodiments of the invention.

FIG. 9 is a block diagram of an optical receiver 15 according to some embodiments. The optical receiver 15 is configured to receive the optical signal transmitted by the optical transmitter 11 through the transmission channel 13 and to generate an estimate of the original input data sequence. Accordingly, the optical receiver 15 may comprise:

an optical-digital front-end 91 configured to detect the optical signals, using for example one or more photodiodes, and to convert them into a digital signal. The optical-digital front-end 91 may comprise a FAN-OUT device (not illustrated in FIG. 9);

a plurality of multi-carrier demodulators 92 configured to remove the cyclic prefix and generate a set of decision variables to be delivered to the Space-Time decoder 93;

a Space-Time decoder 93 configured to generate an estimate of the modulated data sequence from the set of decision variables by applying a Space-Time decoding algorithm;

a demodulator 94 configured to generate a binary sequence by performing a demodulation of the modulated data sequence estimated by the Space-Time decoder 93;

a de-interleaver 95 configured to rearrange the order of the bits (in general the symbols) in the binary sequence delivered by the demodulator 94 to restore the original order of the bits; and a FEC decoder 96 (also referred to as 'an error correcting code decoder 96') configured to deliver an estimate of the input data sequence processed by the optical transmitter device 11 by applying a soft or hard-decision FEC decoder to the reordered binary sequence delivered by the de-interleaver 95. Exemplary soft-decision FEC decoders comprise the Viterbi algorithm.

The Space-Time decoder 93 may implement a Space-Time decoding algorithm chosen in a group consisting of a maximum likelihood decoder, a Zero-Forcing decoder, a Zero-Forcing Decision Feedback Equalizer, and a Minimum Mean Square Error decoder.

Exemplary maximum likelihood decoders comprise the sphere decoder, the Schnorr-Euchner decoder, the stack decoder, the spherical-bound-stack decoder.

In embodiments using single-carrier modulations, the plurality of multi-carrier modulators 92 may be replaced by a single modulator. Similarly, the multi-carrier demodulators 92 may be replaced by a single demodulator.

In some embodiments in which the FEC encoder 81 implements a concatenation of two or more forward error correcting codes, a corresponding structure may be implemented by the FEC decoder 96. For example, in embodiments based on a serial concatenation of an inner code and an outer code, the FEC decoder 96 may comprise an inner code decoder, a de-interleaver, and an outer code decoder (not shown in FIG. 9). In embodiments involving two codes in a parallel architecture, the FEC decoder 96 may comprise a de-multiplexer, a de-interleaver, and a joint decoder (not shown in FIG. 9).

The following description of certain embodiments of the invention will be made with reference to an optical communication system 100 using a single polarization, a single wavelength, a single carrier-modulation, a single error correcting code without Space-Time Coding, and a single-mode multi-core fiber, for illustration purposes only. However, the skilled person will readily understand that the various embodiments of the invention can also be applied in multi-core fibers in combination with polarization multiplexing using two polarizations and/or in combination with wavelength multiplexing using a plurality of wavelengths, and/or in combination with mode multiplexing using multi-mode fiber cores, and/or in combination with multi-carrier modulation formats, and/or in combination with Space-Time coding.

To facilitate the understanding of some embodiments of the invention, there follows some notations and/or definitions used hereinafter:
L designates the total length of the multi-core fiber in the optical fiber transmission channel 13;
K designate the number of fiber sections composing the multi-core fiber;
d designates a correlation length;
$R_b$ designates a bending radius;
$N_c \geq 2$ designates the total number of cores in the multi-core fiber, the cores being numbered (i.e. each core being associated with a core number varying between 1 and $N_c$) such that the a core is designated as core-n with n taking value between 1 and $N_c$;
$R_n$ designates the radius of core-n;
the core parameters associated with the core-n with n=1, ..., $N_c$ are denoted by $\{T_n; \lambda_n\}$ with $T_n$ designating the core type of core-n and $\lambda_n$ designating a core loss value associated with the core-n;
$XT_{n,m}$ refers to a crosstalk coefficient quantifying the crosstalk between the core-n and the core-m with n≠m;
$k_{n,m}$ refers to a coupling coefficient quantifying the coupling between the core-n and the core-m with n≠m;
$\Delta\beta_{nm}$ stands for the propagation constant difference between the core-n and the core-m with n≠m;

The various embodiments of the invention provide efficient scrambling techniques to reduce the core-related impairments and mitigate of the core dependent loss affecting the multi-core fiber by performing a deterministic scrambling of the cores in the multi-core fiber enabling to average the core dependent loss experienced by the cores.

In some embodiments, the optical transmission system 100 may comprise:
a scrambling configuration device 17 configured to determine a scrambling function depending on one or more of the core parameters associated with the $N_c \geq 2$ cores comprised in the multi-core fiber, and
at least one scrambling device 133 arranged in the optical fiber transmission channel 13 for scrambling the $N_c \geq 2$ cores comprised in the multi-core fiber, each of the at least one scrambling device 133 being configured to determine permuted cores by applying the scrambling function determined by the scrambling configuration device 17 to the $N_c \geq 2$ cores and to redistribute the optical signals propagating along the multi-core fiber according to the permuted cores.

According to some embodiments, a core parameter associated with each core core-n may be chosen in a group comprising a core type $T_n$ and a core loss value $\lambda_n$.

The following description will be made with reference to a multi-core fiber in which each core core-n is associated with the set of core parameters $\{T_n; \lambda_n\}$ comprising the core type $T_n$ and a core loss value $\lambda_n$, for illustration purposes.

The optical transmission channel 13 may be represented by an optical multiple-input multiple-output (MIMO) system described by the relation:

$$Y = H \cdot X + N \qquad (1)$$

In equation (1):
X designates a complex-value vector of length $N_c$ comprising $N_c$ symbols transmitted over the optical transmission channel 13 such that the $n^{th}$ symbol is transmitted over the core-n with n=1, ..., $N_c$;
Y is a complex-value vector of length $N_c$ designating the received signal at the optical receiver 15,
H is a complex-value matrix of dimensions $N_c \times N_c$ designating the optical channel matrix and representing the undergone attenuations and the losses experienced by the cores during the optical signal propagation over the different cores in the multi-core fiber in addition to the misalignment losses, and
N is a real-value vector of length $N_c$ designating the optical channel noise.

According to some embodiments, the optical channel noise may be a White Gaussian Noise of zero-mean and variance $N_0$.

According to some embodiments, the optical fiber transmission channel 13 experiences inter-core crosstalk effects and misalignment effects.

The inter-core crosstalk effects may be represented by a cross-talk channel matrix denoted by $H_{XT}$ expressed according to:

$$H_{XT} = \begin{bmatrix} XT_1 & XT_{1,2} & \cdots & XT_{1,N_c} \\ XT_{2,1} & \ddots & \cdots & XT_{2,N_c} \\ \vdots & \vdots & \ddots & \vdots \\ XT_{N_c,1} & XT_{N_c,2} & \cdots & XT_{N_c,N_c} \end{bmatrix} \qquad (2)$$

In equation (2), the diagonal entries of the crosstalk channel matrix are given by $XT_n = 1 \Sigma_{n \neq m} XT_{n,m}$. The crosstalk represents the exchanging energy between the cores and can be estimated based on the coupled-power theory, known to the person skilled in the art.

According to some embodiments in which the multi-core fiber is homogeneous, the crosstalk coefficients $XT_{n,m}$ quantifying the crosstalk between each core-n and core-m with $n \neq m$ are expressed according to:

$$XT_{n,m} = \frac{2k_{n,m}^2 R_b}{\Lambda \beta^2} L \qquad (3)$$

In equation (3), $\Lambda$ designates the core-to-core distance and $\beta^2$ refers to the propagation constant.

According to some embodiments in which the multi-core fiber is heterogeneous, the crosstalk coefficients $XT_{n,m}$ quantifying the crosstalk between each core-n and core-m with $n \neq m$ according to:

$$XT_{n,m} = \frac{2k_{n,m}^2}{\Delta\beta_{n,m}^2 d} L \qquad (4)$$

In some embodiments, the misalignment losses may rise due to the imperfections of the optical fiber at the fiber spans and of the connectors (e.g. the connectors between the FAN-IN/FAN-OUT devices and the input/output ends of the optical fiber transmission channel). Misalignment losses may comprise longitudinal misalignments, transverse misalignments, and angular misalignments.

According to some embodiments, the misalignment losses may be modeled as random Gaussian variables. More specifically, the misalignment loss associated with core-n may be modeled as a random Gaussian variable of zero-mean and a standard deviation denoted by $\sigma_{(x,y),n}$ expressed according to:

$$\sigma_{(x,y),n} = \frac{r_d}{R_n} \qquad (5)$$

In equation (5), $r_d$ designates the transverse displacement of the multi-core fiber in the 'x' and 'y' directions.

According to some embodiments, the scrambling configuration device 17 may be configured to determine the core loss value $\lambda_n$ associated with each core core-n for $n=1, \ldots, N_c$ depending on at least one crosstalk coefficients $XT_{n,m}$ for $m \neq n$ and at least one misalignment loss value (also referred to 'misalignment loss coefficient'), the crosstalk coefficient $XT_{n,m}$ representing the crosstalk between the core-n and a neighbor core core-m to the core core-n and the misalignment losses coefficients representing the misalignments of the multi-core fiber.

According to some embodiments, the scrambling configuration device 17 may be configured to determine the core loss value $\lambda_n$ associated with each core core-n for $n=1, \ldots, N_c$ by applying a singular value decomposition to the optical channel matrix H. In particular, the scrambling configuration device 17 may be configured first to perform a QR decomposition of the optical channel matrix according to:

$$H = QR \qquad (6)$$

In equation (6), Q is a $N_c \times N_c$ orthogonal matrix and R is a $N_c \times N_c$ upper triangular matrix. The values of the diagonal entries of the upper triangular matrix R are given by:

$$R_{ii} = \alpha_i \sqrt{(XT_i)^2 + \Sigma_{j=1}^{N_c}(XT_{i,j})^2} \qquad (7)$$

In equation (7), $\alpha_i$ designates the total misalignment loss associated with the core core-i and $XT_i = 1 - \Sigma_{i \neq m} XT_{i,m}$ designates a total crosstalk coefficient quantifying the total crosstalk associated with the core core-i at the end of the optical transmission channel 13, the total crosstalk coefficient associated with the core core-i being dependent on the crosstalk coefficients quantifying the crosstalk between said core core-i and the remaining cores in the multi-core fiber.

Using the QR decomposition of the optical channel matrix, the singular value decomposition of the optical channel matrix can be expressed according to:

$$H = U \cdot \Sigma \cdot V \qquad (8)$$

In equation (8), the matrix $\Sigma$ is a $N_c \times N_c$ diagonal matrix given by:

$$\sum = \begin{bmatrix} \alpha_1 XT_1 & \cdots & 0 \\ \vdots & \ddots & \vdots \\ 0 & \cdots & \alpha_{N_c} XT_{N_c} \end{bmatrix} \qquad (9)$$

The multi-core fiber is made of a concatenation of K fiber spans, each span is equivalent to a multiplication of a crosstalk channel matrix and a misalignment channel matrix. Accordingly, the optical MIMO system of equation (1) can be equivalently expressed according to:

$$Y = \sqrt{L} \Pi_{k=1}^{K}((H_{XT,k})M_k)X + N \qquad (10)$$

In equation (10):
L designates a normalization factor used to compensate the optical fiber link loss;
$H_{XT,k}$ designates the crosstalk channel matrix associated with the $k^{th}$ fiber span, and
$M_k$ designates the misalignment channel matrix associated with the $k^{th}$ fiber span.

Using the fiber decomposition into fiber spans, the misalignment losses coefficients $\alpha_i$ may be given by:

$$\alpha_i = \Pi_{k=1}^{K} \alpha_i^k = c \cdot \exp(Z_i); Z_i = \Sigma_{k=1}^{K} -b(dx_{k,i}^2 + dy_{k,i}^2) \qquad (11)$$

In equation (11), c designates a constant multiplication factor, $dx_{k,i}^2$ and $dy_{k,i}^2$ for $i=1, \ldots, N_c$ designate Chi-squared distributed random variables with one degree of freedom, a mean value equal to $(\sigma_{(x,y),i})^2$, and a variance equal to $2(\sigma_{(x,y),i})^4$.

Considering embodiments in which the number of fiber spans K is high, the inventors showed that the variable Z can be modeled as a normally distributed variable with mean $\mu_{Z_i} = -2Kb(\sigma_{(x,y),i})^2$ and variance $\sigma_{Z_i}^2 = 4Kb^2\sigma_{(x,y),i}^4$. Accordingly, the total losses coefficients $\alpha_i$ can be modeled by a lognormal random variable with a mean value $\mu_{\alpha_i}$ and a variance value $\sigma_{\alpha_i}^2$ given respectively by:

$$\mu_{\alpha_i} = \exp(\mu Z_i + \sigma_{Z_i}^2/2) \qquad (12)$$

$$\sigma_{\alpha_i}^2 = (\exp(\sigma_{Z_i}^2) - 1) \cdot \mu_{\alpha_i}^2 \qquad (13)$$

According to the derivation of the singular value decomposition of the optical channel matrix, the optical MIMO system of equation (1) can be expressed according to:

$$Y = \sqrt{L} \cdot U \cdot \begin{bmatrix} \alpha_1 XT_1 & \cdots & 0 \\ \vdots & \ddots & \vdots \\ 0 & \cdots & \alpha_{N_c} XT_{N_c} \end{bmatrix} V \cdot X + N = \qquad (14)$$

$$\sqrt{L} \cdot U \cdot \begin{bmatrix} \lambda_1 & \cdots & 0 \\ \vdots & \ddots & \vdots \\ 0 & \cdots & \lambda_{N_c} \end{bmatrix} V \cdot X + N$$

According to equation (14), the scrambling configuration device 17 may be configured to determine the core loss value $\lambda_n$ associated with each core core-n, for n=1, ..., $N_c$, such that the core loss value $\lambda_n$ is a lognormally distributed variable with mean $\mu_{\lambda_n} = \mu_{\alpha_n} XT_n$ and variance $\sigma_{\lambda_n}^2 = \sigma_{\alpha_n}^2 XT_n$, the mean and the variance of each core loss value being dependent on the total crosstalk coefficient $XT_n$ associated with said each core and on the misalignment losses rising in the mean and the variance of the lognormal distribution of the misalignment losses coefficients $\alpha_i$.

According to some embodiments, the core scrambling may be performed depending on the core loss values for averaging the losses experienced by the different cores, the scrambling function being accordingly to a scrambling criterion that depends on the core loss values.

In such embodiments, the scrambling configuration device 17 may be configured to order the $N_c \geq 2$ cores comprised in the multi-core fiber according to a given order (increasing or decreasing) of the core loss values associated with said cores. The cores core-i for i taking value between 1 and $N_c$ may be accordingly ordered in a numbered list denoted by $\mathcal{C} = (\{core_1, \{T_1, \lambda_1\}\}, \{core_3, \{T_2, \lambda_2\}\}, \{core_3, \{T_3, \lambda_3\}\}, \ldots, \{core_{N_c}, \{T_{N_c}, \lambda_{N_c}\}\})$ such that each core $core_i$ in the numbered list $\mathcal{C}$ is associated with a core loss value $\lambda_i$ higher than or smaller than the core loss value $\lambda_{i+1}$ associated with the core $core_{i+1}$ depending on the given order considered to order the cores.

For example, for an increasing order of the core loss values, the cores $core_i$ are ordered in the list such that the core loss value $\lambda_i$ associated with the core $core_i$ is smaller than or equal to the core loss value $\lambda_{i+1}$ associated with the core $core_{i+1}$, that is $\lambda_i \leq \lambda_{i+1}$ for i=1, ..., $N_c - 1$.

In embodiments using a decreasing order of the core loss values, the cores $core_i$ may be ordered in the list such that the core loss value $\lambda_i$ associated with the core $core_i$ is higher than or equal to the core loss value $\lambda_{i+1}$ associated with the core $core_{i+1}$, that is $\lambda_i > \lambda_{i+1}$ for i=1, ..., $N_c - 1$.

Given the order of the core loss values, the scrambling configuration device 17 may be configured to determine a scrambling function denoted by it depending on the order of the core loss values associated with the two or more cores.

Using the notation of the numbered list, the scrambling configuration device 17 may be configured to determine the scrambling function $\pi$ for permuting a core $core_i$ with a core $core_j$ in the numbered list with i taking value between 1 and $N_c$ and j=$N_c - i + 1$. Accordingly, the scrambling function $\pi$ may enable permuting the core $core_1$ with the core $core_{N_c}$, permuting the core $core_2$ with the core $core_{N_c - i}$, etc such that the core associated with the first highest core loss value is permuted with the core associated with the first lowest core loss value, the core associated with the second highest core loss value is permuted with the core associated with the second lowest core loss value, so on.

In some embodiments in which the number $N_c \geq 2$ of cores in the multi-core fiber is an even number, the scrambling configuration device 17 may be configured to determine the scrambling function for permuting the two or more cores two-by-two according to the permutation of the core $core_i$ associated with the $i^{th}$ highest core loss value with the core $core_{N_c - i + 1}$ associated with the $i^{th}$ lowest core loss value, with i being comprised between 1 and the half of the number of cores in the multi-core fiber, that is $$i = 1, \ldots, \frac{N_c}{2}.$$

In other embodiments in which the number $N_c \geq 2$ of cores in the multi-core fiber is an odd number, the scrambling configuration device 17 may be configured to determine the scrambling function for permuting the two or more cores two-by-two according to the permutation of the core $core_i$ associated with the $i^{th}$ highest core loss value with the core $core_{N_c - i + 1}$ associated with the $i^{th}$ lowest core loss value, with i being comprised between 1 and the floor part of half the number of cores in said multi-core fiber, that is $$i = 1, \ldots, \left\lfloor \frac{N_c}{2} \right\rfloor,$$

the operator $\lfloor . \rfloor$ designating the floor operation. Accordingly, the core $$core_{\left\lfloor \frac{N_c}{2} \right\rfloor + 1}$$

may not be permuted.

In particular, in some embodiments in which the cores are arranged in the fiber according to a 2D grid, the core $$core_{\left\lfloor \frac{N_c}{2} \right\rfloor + 1}$$

may correspond to the central core.

The determination of the scrambling function depending on the core loss values may be performed for optical transmission systems using a homogeneous or a heterogeneous multi-core fiber.

According to some embodiments in which the multi-core fiber is a heterogeneous multi-core fiber, the scrambling configuration device 17 may be configured to determine the scrambling function $\pi$ depending on the core types $T_n$ for n=1, ..., $N_c$ associated with the cores in the multi-core fiber. More specifically, the scrambling configuration device 17 may be configured to determine the scrambling function $\pi$ corresponding to a two-by-two permutation of said the cores according to the permutation of at least a first core $core_n$ with a second core $core_m$ with n≠m, the first core $core_n$ and the second core $core_m$ being associated with different core types $T_n \neq T_m$.

In some embodiments in which the multi-core fiber is a heterogeneous multi-core fiber, the scrambling configuration device 17 may be configured to determine the scrambling function $\pi$ depending on the core types $T_n$ for n=1, ..., $N_c$ and the core loss values $\lambda_n$ for n=1, ..., $N_c$ associated with the $N_c$ cores, the scrambling function corresponding in such embodiments to a two-by-two permutation of the $N_c$ cores according to the permutation of at least a first core $core_n$ with a second core $core_m$ with n≠m, the first core $core_n$ and the second core $core_m$ being associated with different core types $T_n \neq T_m$ and different core loss values.

The scrambling configuration device 17 may be configured to communicate the determined scrambling function $\pi$ to at least one scrambling device 133 arranged in the optical transmission channel 13 for scrambling the cores in the multi-core fiber by applying the scrambling function Tr.

In some embodiments in which the optical fiber is a concatenation of K fiber slices, the optical transmission channel 13 may comprise at least one scrambling device 133 arranged periodically in the optical transmission channel 13 according to a scrambling period denoted by $K_{SCT}$. Accordingly, a scrambling device 133 may be arranged in the $k^{th}$ fiber slice if k is a multiple of the scrambling period.

The scrambling function $\pi$ may be represented in a two-dimensional form according to $$\pi = \begin{pmatrix} core_1 & core_2 & \ldots & core_{N_c} \\ \pi(core_1) & \pi(core_2) & \ldots & \pi(core_{N_c}) \end{pmatrix},$$

where a core $core_i$ is permuted with the core $core_j = \pi(core_i)$ of a different type.

The scrambling function $\pi$ may be represented in a matrix form by a permutation matrix denoted by P, the entries of the permutation matrix are given by:

$$P_{ij} = \begin{cases} 1 & \text{if } \pi(core_i) = core_j \\ 0 & \text{otherwise} \end{cases} \quad (15)$$

According to some embodiments in which the multi-core fiber is heterogeneous, the scrambling configuration device 17 may be configured to determine the scrambling function $\pi$ depending on the core types $T_n$ for n=1, ..., $N_c$ associated with the cores in the multi-core fiber by applying, for example and without limitation, a scrambling technique chosen in a group comprising a snail scrambling technique, a rotation scrambling technique, and a snake scrambling technique.

In order to apply one of the snail, rotation, and snake scrambling techniques, the scrambling configuration device 17 may be first configured to classify the cores core-i for i taking value between 1 and $N_c$ in a numbered set denoted by $\mathcal{C} = (\{core_1, \{T_1, \lambda_1\}\}, \{core_3, \{T_2, \lambda_2\}\}, \{core_3, \{T_3, \lambda_3\}\}, \ldots, \{core_{N_c}, \{T_{N_c}, \lambda_{N_c}\}\})$ such that each core $core_i$ in the numbered list $\mathcal{C}$ is associated with different core types, for i=1, ..., $N_c$.

Using the numbering of the cores in the set $\mathcal{C}$ and according to any of the snail, rotation, or snake scrambling techniques, the scrambling configuration device 17 may determine the scrambling function $\pi$ such that for each core $core_i$ in the set $\mathcal{C}$ with i=1, ..., $N_c-1$, the core $core_i$ is permuted with the core $\pi(core_i) = core_{i+1}$ and that the core $core_{N_c}$ is permuted with the core $\pi(core_{N_c}) = core_1$. The scrambling function $\pi$ is accordingly expressed in a two-dimensional form as $$\pi = \begin{pmatrix} core_1 & core_2 & \ldots & core_{N_c} \\ core_2 & core_3 & \ldots & core_1 \end{pmatrix}.$$

Based on this scrambling function, the symbols propagating through the different cores are permuted such that the $i^{th}$ symbol propagating through the core $core_i$, propagates after the application of the scrambling function through the core $\pi(core_i)$.

In a first example, the snail scrambling technique corresponds to the application of the scrambling rule $\pi(core_i) = core_{i+1}$ for i=1, ..., $N_c-1$ and $\pi(core_{N_c}) = core_1$ in a heterogeneous multi-core fiber comprising an odd number of cores among which a core is a central core and the remaining cores are arranged in the edges of the hexagon. In particular, depending on the ordering of the cores in the set $\mathcal{C}$, the core $core_1$ may correspond to the central core.

Figure 11:
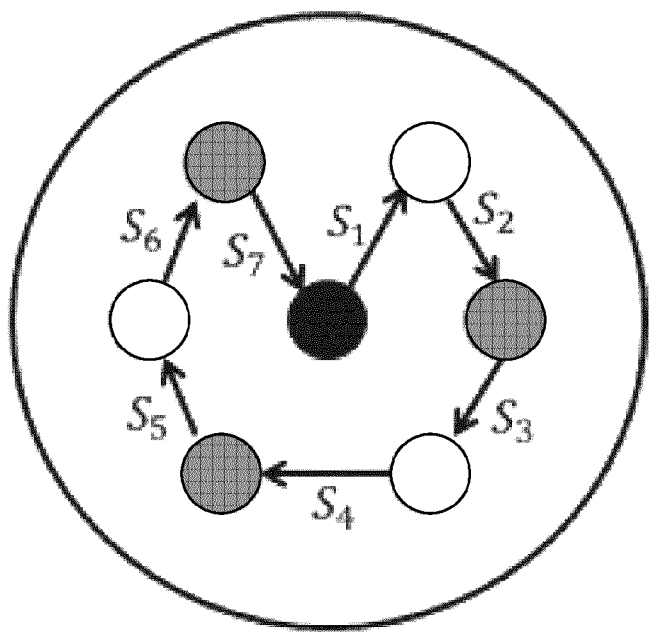
FIG. 11 illustrates a cross section view of a multi-core fiber, according to some embodiments in which a snail scrambling technique is considered.

FIG. 11 is a cross section view of a 7-cores heterogeneous multi-core fiber in which the seven cores are scrambled using a snail scrambling technique according to the clockwise direction such that the central core is permuted with his neighbor core located on the right side and that each of the remaining cores is permuted with its left-hand neighbor core of a different type, the core located on the left side of the central core being permuted with the central core. The scrambling function may be written in this example in the two-dimensional form as $$\pi = \begin{pmatrix} core_1 & core_2 & \ldots & core_7 \\ core_2 & core_3 & \ldots & core_1 \end{pmatrix}$$

such that $core_1$ corresponds to the central core and in the matrix representation according to:

$$P = \begin{pmatrix} 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \\ 1 & 0 & 0 & 0 & 0 & 0 & 0 \end{pmatrix}$$

The symbols $s_1, s_2, \ldots, s_7$ are accordingly permuted such that after the application of the scrambling function, the symbol $s_1$ propagates through the core $core_2$, each symbol $s_i$ for i=2, ..., 6 propagates through the core $core_{i+1}$, and the symbol $s_7$ propagates through the central core.

Figure 12:
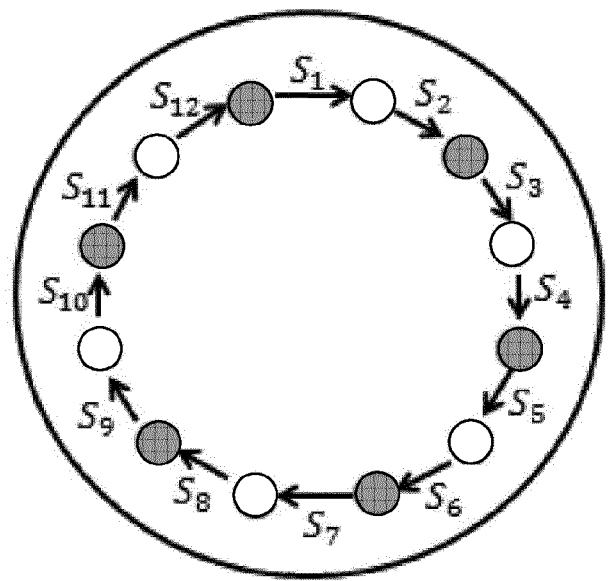
FIG. 12 illustrates a cross section view of a multi-core fiber, according to some embodiments in which a rotation scrambling technique is considered.

FIG. 12 illustrates a cross section view of a 12-cores heterogeneous multi-core fiber in which the twelve cores are permuted using a rotation scrambling technique according to the clockwise direction. The cores are arranged in a ring form. Using the rotation scrambling technique, each core is permuted with its right-hand neighbor core of a different type such that $\pi(core_i) = core_{i+1}$ for i=1, ..., 11 and the core $core_{12}$ is permuted with the core $core_1$.

Figure 13:
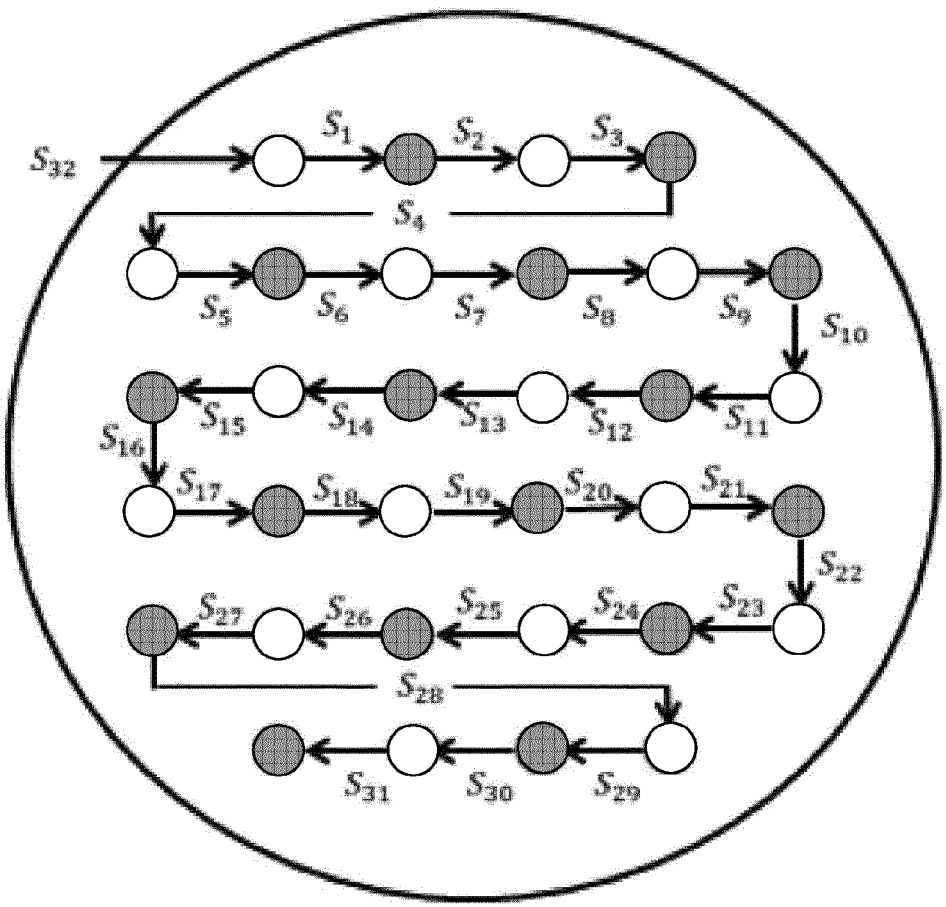
FIG. 13 illustrates a cross section view of a multi-core fiber, according to some embodiments in which a snake scrambling technique is considered.

FIG. 13 illustrates a cross section view of a 32-cores heterogeneous multi-core fiber in which the cores are permuted using a snake scrambling technique according to the clockwise direction. The cores are arranged in a two-dimensional grid comprising six layers. The first upper layer comprises four cores numbered as $core_1$, $core_2$, $core_3$, $core_4$. The second layer located underside the first layer comprises six cores numbered as $core_5$-$core_{10}$. The third layer located underside the second layer comprises six cores numbered $core_{11}$ $core_{16}$. The fourth layer located below the third layer comprises six cores numbered $core_{17}$ $core_{22}$. The fifth layer located below the fourth layer comprises six cores numbered $core_{23}$ $core_{28}$. And finally a lower layer comprises four cores numbered $core_{29}$ $core_{32}$. According to the snake scrambling technique, each core in each layer is permuted with its right-hand neighbor core of a different type, the last core of each layer is permuted with the first core of the layer located below said each layer, and the core $core_{32}$ (i.e. the last core of the lower layer) is permuted with the core $core_1$ (i.e. with the first core of the upper layer).

FIGS. 11, 12, and 13 illustrate examples of the application of the snail, rotation, and snake scrambling techniques according to a permutation of the cores in the clockwise direction. However, it should be noted that the snail, rotation, and snake scrambling techniques may be also applied according to a permutation of the cores in the counterclockwise direction.

Using the matrix notation of the scrambling function, the optical fiber transmission channel including the scrambling devices 133 can be expressed according to:

$$Y = \sqrt{L} \Pi_{k=1}^{K}((H_{XT,k})M_k P^{(k)})X + N \quad (16)$$

In equation (16), the matrix $P^{(k)}$ is a $N_c \times N_c$ matrix representing the application of the scrambling function $\pi$ in the $k^{th}$ fiber span by the $k^{th}$ scrambling device, k being a multiple of the scrambling period.

According to some embodiments, at least one scrambling device 133 may be configured to apply the scrambling function $\pi$ in the electrical field.

In other embodiments, at least one scrambling device 133 may be an optical device, configured to apply the scrambling function $\pi$ in the optical field. Exemplary optical scrambling devices comprise converters, optical multiplexers, optical multiplexing devices, and photonic lanterns.

According to some embodiments, the scrambling configuration device 17 may be configured to determine the scrambling function during the phase of the design of the optical fiber transmission channel prior to the installation of the scrambling device(s) 133.

In other embodiments, the scrambling configuration device 17 may be configured to determine the scrambling function for the configuration of one or more scrambling devices 133 in an operating optical transmission channel 13.

There is also provided a method for transmitting data in an optical transmission system 100 over an optical fiber transmission channel 13 made of a multi-core fiber, optical signals carrying data propagate along the multi-core fiber according to $N_c \geq 2$ cores, each core being associated with one or more core parameters.

Figure 10:
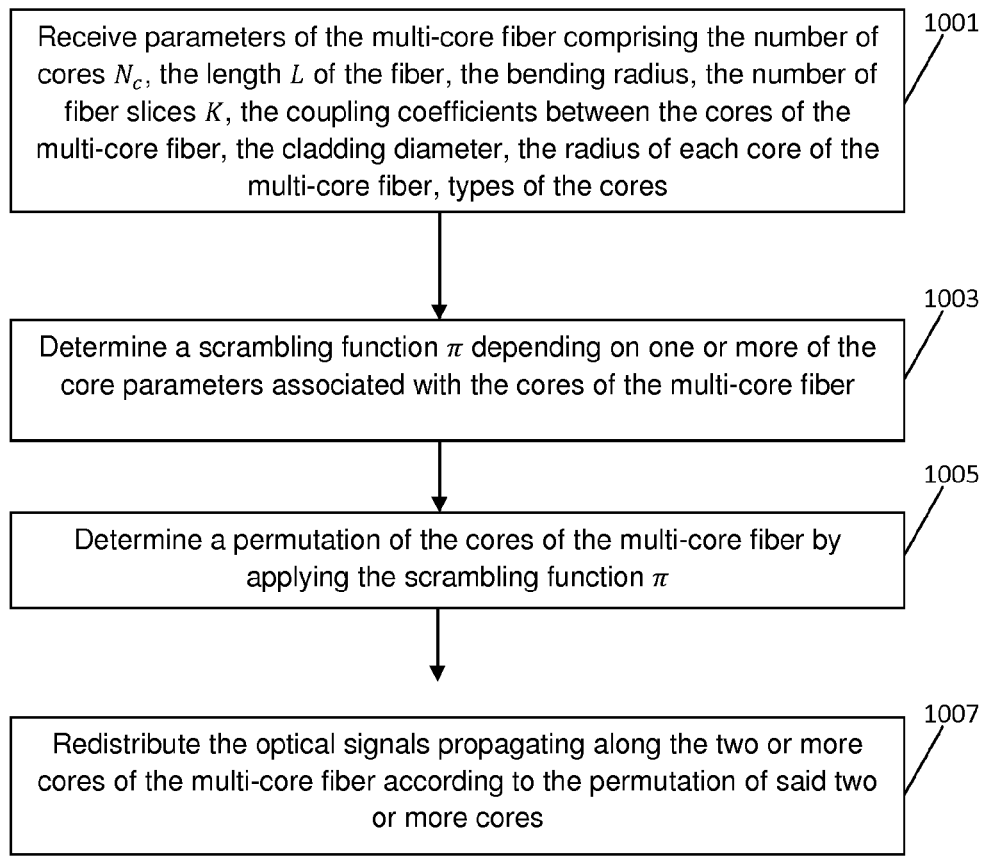
FIG. 10 is a flowchart illustrating a method for transmitting data over an optical transmission channel, according to some embodiments in which core scrambling is performed.

FIG. 10 is a flowchart depicting a method of transmitting data over an optical fiber transmission channel 13, according to some embodiments using a single polarization, a single wavelength, a single carrier-modulation, a single error correcting code without Space-Time Coding, and a single-mode multi-core fiber.

At step 1001, parameters of the multi-core fiber may be received. These parameters may comprise the number of cores $N_c \geq 2$, the length L of the fiber, the bending radius $R_b$, the number K of fiber slices, the coupling coefficients $k_{n,m}$ between the cores of the multi-core fiber, the cladding diameter, the radius of each core of the multi-core fiber, the type $T_n$ of each core core-n of the multi-core fiber, with n=1, . . . , $N_c$.

At step 1003, a scrambling function $\pi$ may be determined depending on one or more of the core parameters associated with the two or more cores of the multi-core fiber.

In some embodiments, a core parameter associated with each core core-n may be chosen in a group comprising a core type $T_n$ and a core loss value $\lambda_n$.

In some embodiments, the scrambling function $\pi$ may be determined depending on the core loss values associated with the cores of the multi-core fiber.

In such embodiments, at step 1003, the core loss value $\lambda_n$ associated with each core core-n for n=1, . . . , $N_c$ may be determined. In particular, the core loss values associated with the cores of the multi-core fiber may be determined depending on the crosstalk coefficients and the misalignment losses coefficients according to equation (14).

Given the core loss values associated with each of the cores of the multi-mode fiber, the scrambling function $\pi$ may be determined for permuting a core associated with a high core loss value with a core associated with a small core loss value.

In some embodiments, the cores core-i for $i \in \{1, \ldots, N_c\}$ may be ordered in a numbered list $\mathcal{C} = (\{\text{core}_1, \{T_1, \lambda_1\}\}, \{\text{core}_3, \{T_2, \lambda_2\}\}, \{\text{core}_3, \{T_3, \lambda_3\}\}, \ldots, \{\text{core}_{N_c}, \{T_{N_c}, \lambda_{N_c}\}\})$ such that each core $\text{core}_i$ in the numbered list $\mathcal{C}$ is associated with a core loss value $\lambda_i$ higher than or smaller than the core loss value $\lambda_{i+1}$ associated with the core $\text{core}_{i+1}$ depending on the given order considered to order the cores. Given the determined order of the core loss values, the scrambling function $\pi$ may be determined depending on the order of the core loss values associated with the two or more cores.

In an embodiment considering the numbered list of the ordered cores, the scrambling function $\pi$ may be determined for permuting core $\text{core}_i$ associated with the $i^{th}$ highest core loss value with the core $\text{core}_{N_c-i+1}$ associated with the $i^{th}$ lowest core loss value, with $$i = 1, \ldots, \frac{N_c}{2}$$

for an even number of cores $N_c$ and $$i = 1, \ldots, \left\lfloor \frac{N_c}{2} \right\rfloor$$

for an odd number of cores $N_c$.

The determination of the scrambling function depending on the core loss values associated with the cores of the multi-core fiber may be performed in embodiments considering a homogeneous or a heterogeneous multi-core fiber.

In some embodiments in which the multi-core fiber is heterogeneous, the scrambling function may be determined depending on the core types $T_n$ for n=1, . . . , $N_c$ associated with the cores in the multi-core fiber. In such embodiments, the scrambling function may be determined for a two-by-two permutation of the cores according to the permutation of at least a first core $\text{core}_n$ with a second core $\text{core}_m$ with n≠m, the first core $\text{core}_n$ and the second core $\text{core}_m$ being associated with different core types $T_n \neq T_m$.

In some embodiments, the scrambling function may be determined depending on the core types using one of the snail, rotation, or the snake scrambling techniques.

In some embodiments, the scrambling function may be determined depending the core types $T_n$ for n=1, . . . , $N_c$ and the core loss values $\lambda_n$ for n=1, . . . , $N_c$ associated with the $N_c$ cores, the scrambling function corresponding in such embodiments to a two-by-two permutation of the $N_c$ cores according to the permutation of at least a first core $\text{core}_n$ with a second core $\text{core}_m$ with n≠m, the first core $\text{core}_n$ and the second core $\text{core}_m$ being associated with different core types $T_n \neq T_m$ and different core loss values.

At step 1005, a permutation of the core of the multi-core fiber may be performed by applying the scrambling function $\pi$. In particular, the application of the scrambling function may be performed using the matrix representation of the scrambling function given in equation (15).

At step 1007, the optical signals propagating along the cores of the multi-core fiber may be redistributed (at least once) according to the permutation of the cores.

The performance of the proposed deterministic scrambling techniques has been evaluated in terms of core dependent loss and the bit error rates and compared to the performance of existing random scrambling techniques.

Figure 14:
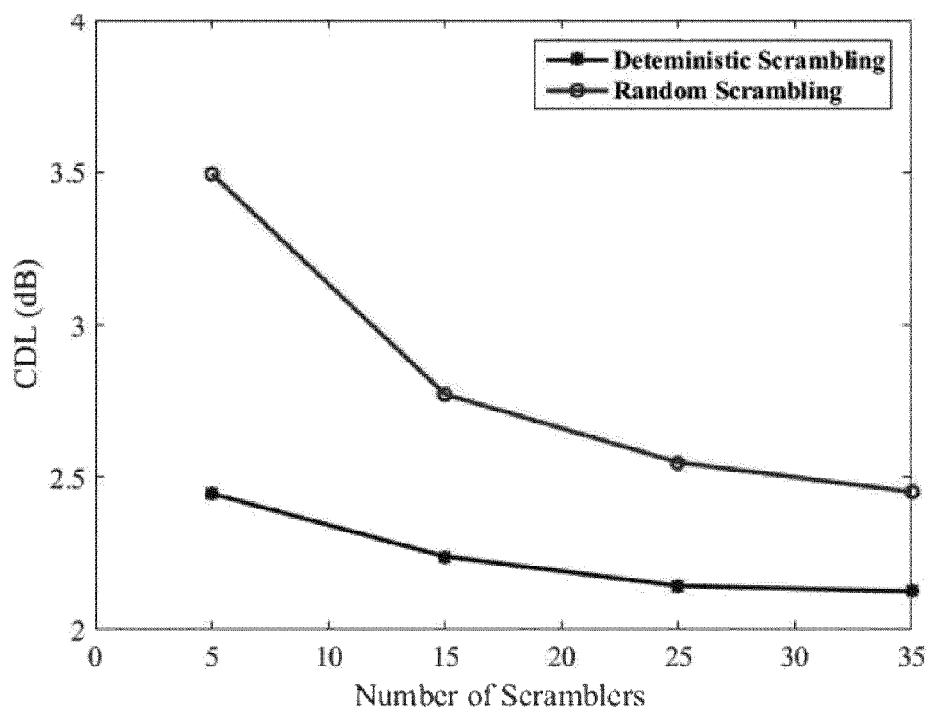
FIG. 14 shows two diagrams representing the core dependent loss as a function of the number of scramblers in some embodiments in which a snail scrambling technique is considered.
Figure 15:
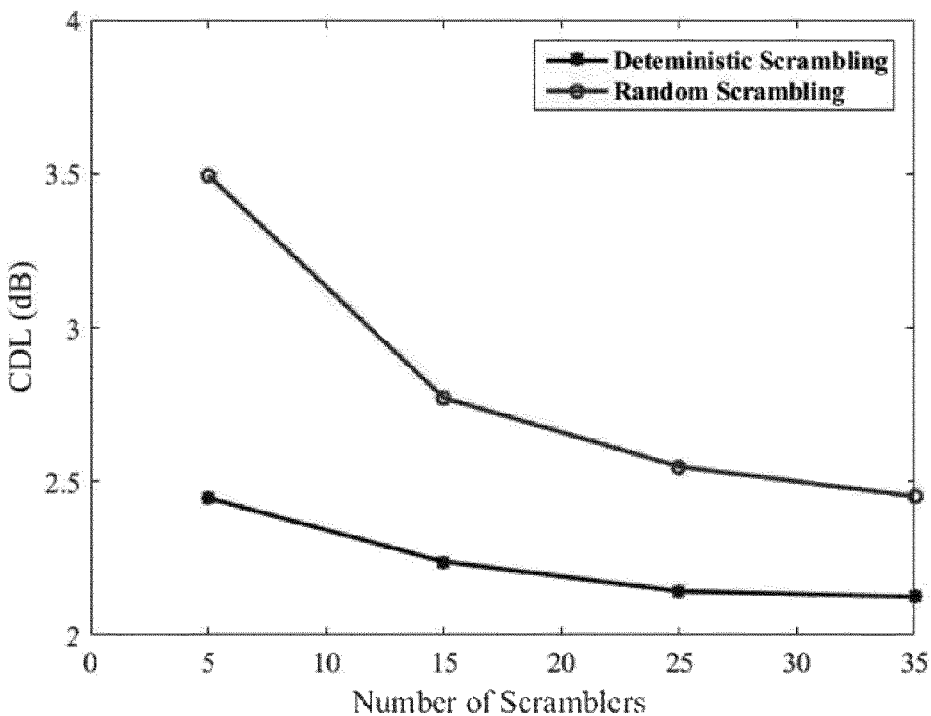
FIG. 15 shows two diagrams representing the core dependent loss as a function of the number of scramblers in some embodiments in which a rotation scrambling technique is considered.
Figure 16:
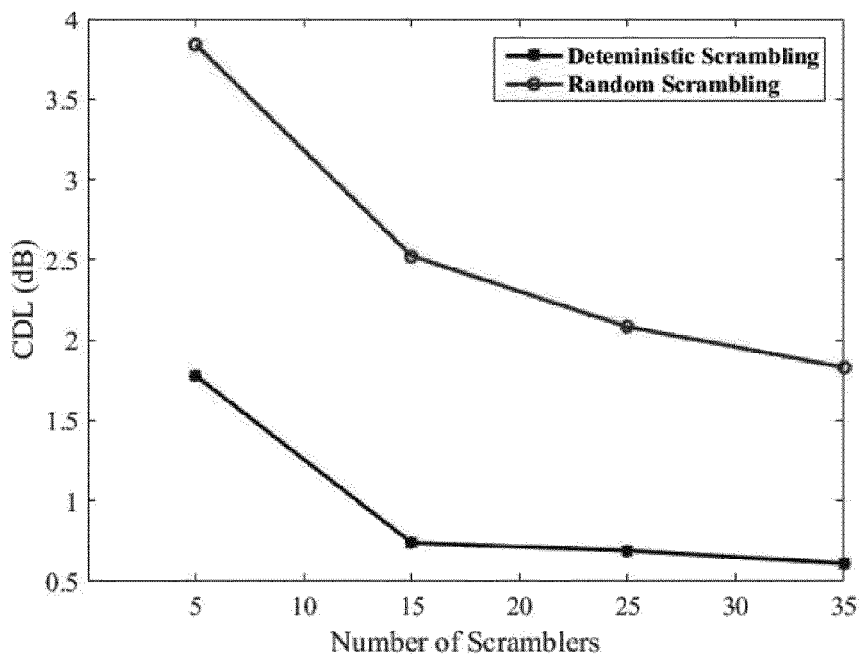
FIG. 16 shows two diagrams representing the core dependent loss as a function of the number of scramblers in some embodiments in which a snake scrambling technique is considered.

FIGS. 14, 15, and 16 depict diagrams representing the evaluation of the core dependent loss as a function of the number of required scramblers obtained respectively by applying the snail, the rotation, and the snake scrambling techniques respectively to a 7-core heterogeneous multi-core fiber (illustrated in FIG. 11), a 12-core heterogeneous multi-core fiber (illustrated in FIG. 12), and a 32-cores heterogeneous multi-core fiber (illustrated in FIG. 13). Depicted simulation results show that using the proposed deterministic scrambling techniques according to the invention enables decreasing the number of scramblers/scrambling devices in the optical fiber transmission system while decreasing the core dependent loss. In particular, a CDL reduction of 2.4 dB can be obtained by installing only five snail scramblers in the 7-cores heterogeneous multi-core fiber instead of installing 25 random scramblers. The CDL can be decreased in the 12-cores multi-core fiber to the minimum value equal to 1.3 dB by installing only 5 deterministic rotation scramblers implementing the rotation scrambling technique while applying the random scramblers allows reaching a CDL lower value of 1.5 dB by installing 35 random scramblers. And in the 32-cores heterogeneous multi-core fiber, the number of scrambling can be decreased from 35 random scramblers to 5 deterministic snake scramblers, both achieving a CDL value of 1.8 dB.

Figure 17:
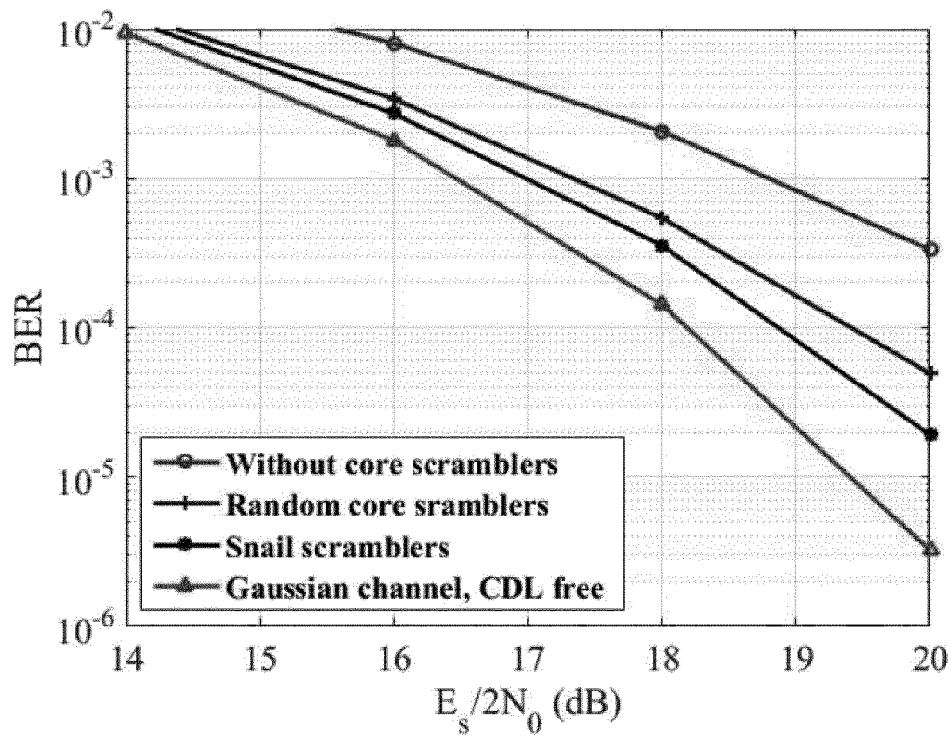
FIG. 17 shows diagrams representing the bit error rate (BER) performance obtained for a multi-core fiber implementing a snail scrambling technique.
Figure 18:
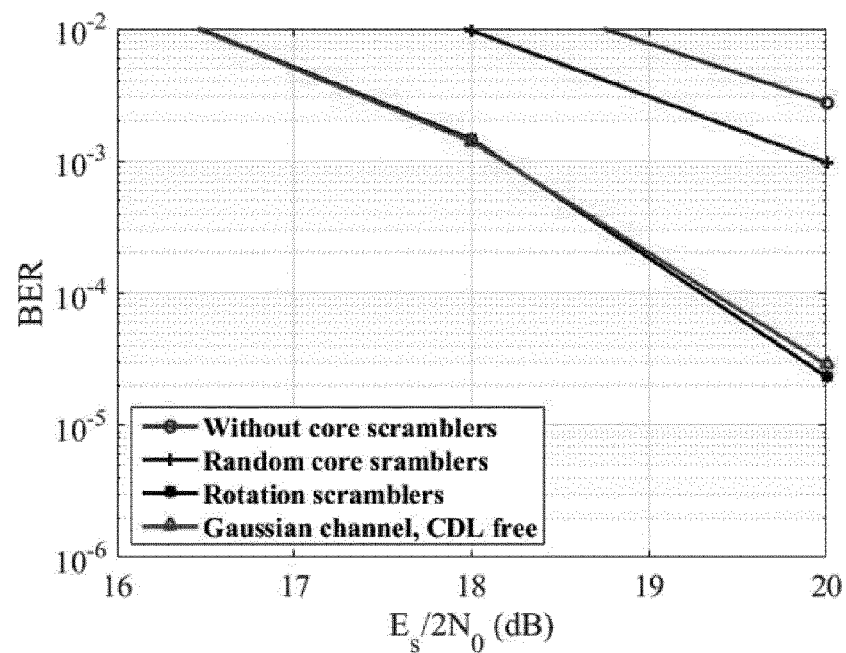
FIG. 18 shows diagrams representing the bit error rate (BER) performance obtained for a multi-core fiber implementing a rotation scrambling technique.
Figure 19:
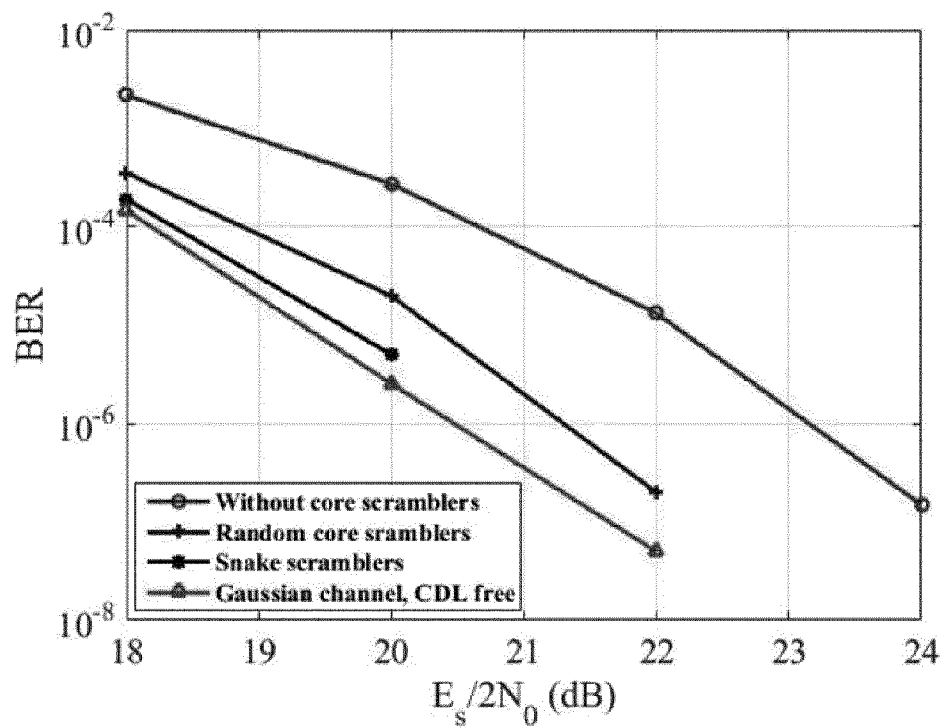
FIG. 19 represents the bit error rate (BER) performance obtained for a multi-core fiber implementing a snake scrambling technique.

FIGS. 17, 18, and 19 depict diagrams representing the evaluation of the bit error rate performance as a function of the signal-to-noise ratio (SNR) obtained respectively by applying a snail scrambling technique to a 7-core heterogeneous multi-core fiber (illustrated in FIG. 11), a rotation scrambling technique to a 12-cores heterogeneous multi-core fiber (illustrated in FIG. 12), and a snake scrambling technique to a 32-cores heterogeneous multi-core fiber (illustrated in FIG. 13). A 16-QAM modulation is used as the modulation scheme at the optical transmitter and Maximum-Likelihood decoding is used at the optical receiver. Such simulation results show that the proposed deterministic scrambling techniques according to the various embodiments of the invention achieve better BER performance than the existing random scrambling techniques and the no-scrambling configurations, and approach the performance of the CDL free transmission channel (referred to as the 'Gaussian Channel'). More specifically, installing 5 snail scramblers implementing the deterministic snail scrambling technique in the 7-cores fiber enables decreasing the SNR penalty compared to the CDL-free channel to 0.5 dB instead of 1 dB at BER=$10^{-3}$ by applying the random scramblers. In the example of the 12-cores fiber, installing 5 deterministic rotation scramblers implementing the rotation scrambling technique enables completely mitigating the core dependent loss, while random scramblers have a 1.5 dB of SNR penalty compared to the CDL-free channel. Performance gains are also obtained for the 32-cores multi-core fiber using the snake scrambling technique as illustrated in FIG. 19. The transmission system without scrambling has a SNR penalty equal to 2.5 dB at BER=$10^{-4}$. Installing the random scramblers decreases this penalty to 0.4 dB, while applying the snake scrambling technique by installing 5 deterministic snake scramblers enables reducing the SNR penalty to 0.1 dB.

Although the various embodiments have been described in connection to single-core multi-mode fibers in which a single polarization, a single wavelength and single-carrier modulation are used, it should be noted that the invention can also be applied in multi-core multi-mode fibers in combination with polarization multiplexing using two polarizations and/or in combination with the use of wavelength multiplexing using several wavelengths, and/or using multi-carrier modulation formats.

Further, the invention is not limited to communication applications and may be integrated in other applications such as data storage and medical imaging. The invention may be used in several optical transmission systems, for example automotive industry applications, in oil or gas markets, in aerospace and avionics sectors, sensing applications, etc.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. An optical transmission system comprising an optical transmitter configured to transmit data over an optical fiber transmission channel made of a multi-core fiber, optical signals carrying said data propagate along the multi-core fiber according to two or more cores, each core being associated with one or more core parameters, wherein the optical transmission system comprises:
   a scrambling configuration device configured to determine a scrambling function depending on one or more of the core parameters associated with said two or more cores, and
   at least one scrambling device arranged in said optical fiber transmission channel for scrambling said two or more cores, each of said at least one scrambling device being configured to determine permuted cores by applying said scrambling function to said two or more cores and to redistribute said optical signals according to said permuted cores, wherein a core parameter associated with each core is chosen in a group comprising a core type and a core loss value.

2. The optical transmission system of claim 1, wherein the scrambling configuration device is configured to determine the core loss value associated with each core depending on at least one crosstalk coefficient and at least one misalignment loss value, a crosstalk coefficient representing the crosstalk between said each core and a neighbor core to said each core, a misalignment loss value representing a misalignment of the multi-core fiber.

3. The optical transmission system of claim 1, wherein the scrambling configuration device is configured to order said two or more cores according to a given order of the core loss values associated with said two or more cores, the scrambling configuration device being configured to determine said scrambling function depending on the order of the core loss values associated with said two or more cores.

4. The optical transmission system of claim 3, wherein the number of said two or more cores in the multi-core fiber is an even number, said scrambling configuration device being configured to determine said scrambling function for permuting the two or more cores two-by-two according to the permutation of the core associated with the $i^{th}$ highest core loss value with the core associated with the $i^{th}$ lowest core loss value, with i being comprised between 1 and the half of the number of cores in said multi-core fiber.

5. The optical transmission system of claim 3, wherein the number of said two or more cores in the multi-core fiber is an odd number, said scrambling configuration device being configured to determine said scrambling function for permuting the two or more cores two-by-two according to the permutation of the core associated with the $i^{th}$ highest core loss value with the core associated with the $i^{th}$ lowest core loss value, with i being comprised between 1 and the floor part of half the number of cores in said multi-core fiber.

6. The optical transmission system of claim 3, wherein the multi-core fiber is a homogeneous multi-core fiber, the two or more cores being associated with an identical core type.

7. The optical transmission system of claim 3, wherein the multi-core fiber is a heterogeneous multi-core fiber, at least two of said two or more cores being associated with different core types.

8. The optical transmission system of claim 1, wherein the multi-core fiber is an heterogeneous multi-core fiber, the scrambling configuration device being configured to determine said scrambling function depending on the core types associated with said two or more cores, said scrambling function corresponding to a two-by-two permutation of said two or more cores according to the permutation of at least a first core with a second core, the first core and the second core being associated with different core types.

9. The optical transmission system of claim 1, wherein the multi-core fiber is an heterogeneous multi-core fiber, the scrambling configuration device being configured to determine said scrambling function depending on the core types and the core loss values associated with the two or more cores, said scrambling function corresponding to a two-by-two permutation of said two or more cores according to the permutation of at least a first core with a second core, the first core and the second core being associated with different core types and different core loss values.

10. The optical transmission system of claim 1, wherein said at least one scrambling device is configured to apply said scrambling function in the electrical field or in the optical field, a scrambling device configured to apply said scrambling function in the optical field being chosen in a group comprising optical converters, optical multiplexers, optical multiplexing devices, and photonic lanterns.

11. The optical transmission system of claim 1, wherein at least one of said two or more cores is a multi-mode core comprising two or more spatial propagation modes.

12. The optical transmission system of claim 1, wherein the optical transmitter comprises:
    an error correcting code encoder configured to encode said data into a codeword vector by applying at least one error correcting code;
    a modulator configured to determine a set of modulated symbols by applying a modulation scheme to said codeword vectors, and
    a Space-Time encoder configured to determine a codeword matrix by applying a Space-Time code to said set of modulated symbols.

13. A method for transmitting data in an optical transmission system over an optical fiber transmission channel made of a multi-core fiber, optical signals carrying said data propagate along the multi-core fiber according to two or more cores, each core being associated with one or more core parameters, wherein the method comprises scrambling said two or more cores, said step of scrambling comprising:
    determining a scrambling function depending on one or more of the core parameters associated with said two or more cores;
    determining a permutation of said two or more cores by applying said scrambling function, and redistributing said optical signals according to said permutation of the two or more cores,
    wherein a core parameter associated with each core is chosen in a group comprising a core type and a core loss value.

* * * * *